US012417236B2

(12) United States Patent
Vasireddy et al.

(10) Patent No.: US 12,417,236 B2
(45) Date of Patent: Sep. 16, 2025

(54) EVALUATING CLUSTERING IN CASE OF DATA STEWARDSHIP ACTIONS

(71) Applicant: Salesforce, Inc., San Francisco, CA (US)

(72) Inventors: Sruthi Vasireddy, San Jose, CA (US); Shouzhong Shi, San Jose, CA (US); Yatin Umrotkar, Fremont, CA (US); Nathan Halko, Boulder, CO (US); Stanislav Georgiev, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/237,524

(22) Filed: Apr. 22, 2021

(65) Prior Publication Data

US 2022/0342909 A1  Oct. 27, 2022

(51) Int. Cl.
*G06F 16/28* (2019.01)
*G06F 16/21* (2019.01)
*G06F 16/2455* (2019.01)
*G06F 16/25* (2019.01)

(52) U.S. Cl.
CPC ......... *G06F 16/285* (2019.01); *G06F 16/213* (2019.01); *G06F 16/24565* (2019.01); *G06F 16/256* (2019.01)

(58) Field of Classification Search
CPC ................. G06F 16/285; G06F 16/213; G06F 16/24565; G06F 16/256
See application file for complete search history.

(56) References Cited

U.S. PATENT DOCUMENTS

| | | | | |
|---|---|---|---|---|
| 5,754,938 | A * | 5/1998 | Herz | G06Q 20/383 |
| | | | | 348/E7.071 |
| 10,338,977 | B2 * | 7/2019 | Yoon | G06F 16/338 |
| 10,489,462 | B1 * | 11/2019 | Rogynskyy | G06Q 10/109 |
| 12,174,857 | B2 * | 12/2024 | Tirupati | G06F 16/2272 |
| 2003/0120652 | A1 * | 6/2003 | Tifft | G16H 10/60 |
| 2003/0182310 | A1 * | 9/2003 | Charnock | G06F 16/38 |
| 2007/0299856 | A1 * | 12/2007 | McKeon | G06F 16/283 |
| 2009/0193046 | A1 * | 7/2009 | Desai | G06F 16/221 |
| 2012/0330959 | A1 * | 12/2012 | Kretz | G06Q 50/265 |
| | | | | 707/E17.014 |
| 2013/0046730 | A1 * | 2/2013 | Sood | G06F 16/972 |
| | | | | 715/764 |

(Continued)

*Primary Examiner* — Mark E Hershley
(74) *Attorney, Agent, or Firm* — Holland & Hart LLP

(57) ABSTRACT

A method, apparatus, and computer-readable medium are disclosed. The method may include receiving a request to merge a first unified profile with a second unified profile, the first and second unified profile each having a set of records grouped according to a set of rules. The method may include merging the first unified profile with the second unified profile to generate a merged unified profile including a merged set of records. The method may include generating an association between the second set of records and the first set of records. The method may include receiving a request to undo the merging. The method may include ingesting, based at least in part on the request to undo the merging, the merged set of records into the automated match process by applying the set of rules and excluding the generated association.

20 Claims, 13 Drawing Sheets

(56) References Cited

U.S. PATENT DOCUMENTS

| | | | | |
|---|---|---|---|---|
| 2013/0124525 | A1* | 5/2013 | Anderson | G06F 16/278 707/737 |
| 2016/0171542 | A1* | 6/2016 | Fanous | G06F 16/9538 705/14.54 |
| 2018/0060537 | A1* | 3/2018 | Tiwari | G06F 16/2282 |
| 2018/0089303 | A1* | 3/2018 | Miller | G06F 16/26 |
| 2018/0218069 | A1* | 8/2018 | Rege | G06F 16/24573 |
| 2018/0247078 | A1* | 8/2018 | Newman | G06F 16/93 |
| 2019/0095498 | A1* | 3/2019 | Srinivasan | G06F 16/213 |
| 2019/0102425 | A1* | 4/2019 | Obeidat | G06F 16/248 |
| 2019/0361925 | A1* | 11/2019 | Rogynskyy | G06F 21/6245 |
| 2019/0387008 | A1* | 12/2019 | Visbal | G06F 3/0482 |
| 2020/0133955 | A1* | 4/2020 | Padmanabhan | H04L 63/123 |
| 2020/0244701 | A1* | 7/2020 | Di Domenico | H04L 63/102 |
| 2020/0387819 | A1* | 12/2020 | Rogynskyy | G06N 20/00 |
| 2021/0216536 | A1* | 7/2021 | Rogers | G06F 16/958 |
| 2022/0004936 | A1* | 1/2022 | Ziemann | G06F 16/00 |
| 2022/0121687 | A1* | 4/2022 | Tirupati | G06F 16/2379 |
| 2022/0342909 | A1* | 10/2022 | Vasireddy | G06F 16/24565 |

* cited by examiner

First Profile Records 310

Second Profile Records 320

EVALUATING CLUSTERING IN CASE OF DATA STEWARDSHIP ACTIONS

FIELD OF TECHNOLOGY

The present disclosure relates generally to database systems and data processing, and more specifically to evaluating clustering in case of data stewardship actions.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud platforms or application servers, multiple records may be automatically matched or clustered into unified profiles. In some cases, after this automatic clustering, a user managing the information (referred to as a data steward) may manually merge two or more unified profiles into a single or merged unified profile. The manual merging of two unified profiles may generate a rule or linkage in the system that associates the records of the two unified profiles with each other. After making this manual merge, the system state may change in various ways. For example, additional records may have been added to the system, records may have been updated, or the rules governing the automatic match procedure may have been changed. Therefore, a simple undo of the merge operation to recreate the original unified profiles may not accurately reflect the current state of the system.

DETAILED DESCRIPTION

Figure 1:
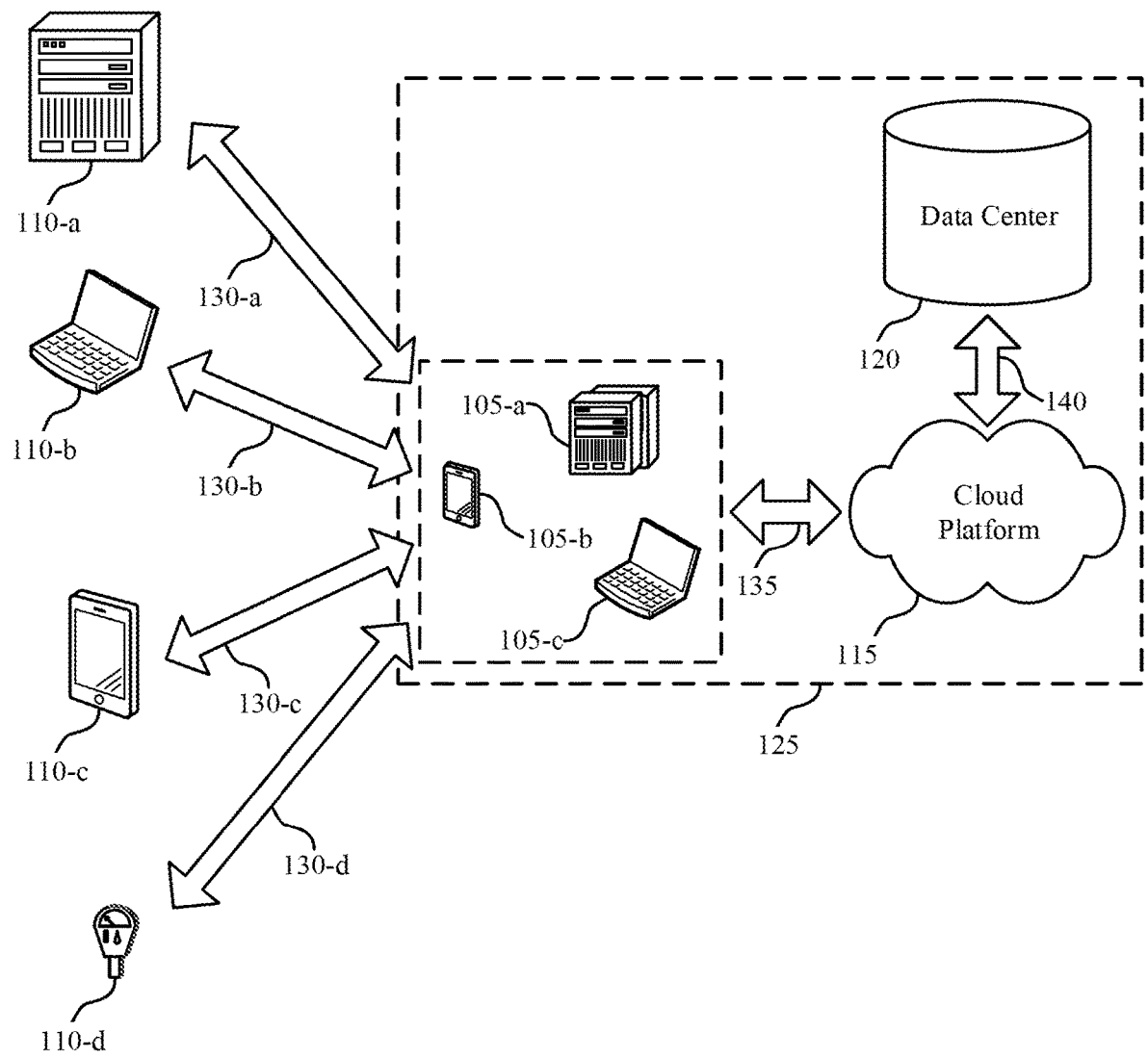
FIG. 1 illustrates an example of an application server system that supports evaluating clustering in case of data stewardship actions in accordance with aspects of the present disclosure.

In some cloud platforms or application servers, a number of records may be stored about various users, companies, or contacts. These records may be obtained from multiple sources, and it may be helpful to recognize or detect various relationships between these records. For examples, the cloud platform or application server may recognize that one record has a particular name, telephone number and address of a contact, and a second record may have the same name and address, but may include a different telephone number. Thus, the cloud platform or application server may recognize, determine, or detect that the two records are related and refer to the same contact. In some examples, the cloud platform or application server may use a match and reconcile process to identify or select records that belong to the same contact, user, or company, and associate them with one another. The related records may also be associated with a unified profile that also indicates or identifies that the various records are related and may refer to the same person or company.

In some cases, an administrator or data steward may decide that multiple unified profiles should be merged. For examples, the data steward, in his judgment, may decide that a first unified profile with a number of records and a second unified profile with another number of records both refer to the same contact. In some cases, such a human determination may be in contrast to the results of a match and reconcile process. In such a case, the data steward may manually merge the unified profiles, such that the records associated with each of the unified profiles are all now associated with a single unified profile (e.g. the first unified profile, the second unified profile, or another unified profile entirely). However, depending on the situation, the records of each of the profiles may not refer to the same contact, and, to recognize this, the merge may be undone. In such a case, the data steward may manually undo the merge of the unified profiles. In some examples, the merge may be undone by restoring a state of the application server or cloud platform to a state occurring before the manual merge of the unified profiles. However, such an approach does not take into account additional edits, additions, deletions, or other changes occurring after the manual merge and before the state restoration, and the state of the application server or cloud platform may be "stale" or out of date. Thus, such undo operations may be deficient.

In some cloud platforms or application servers, undoing a merge of two unified profiles may be performed by taking the records from the merged unified profile and running them back through the automatic match and reconcile process. The system may apply the then-current match rules and current records to recreate clusters or unified profiles, except that the system may now disregard any rule, configuration, or association that was created as a result of the manual merge command. As a result, the records are then unmerged, and grouped into one or more unified profiles based on the automatic match and reconcile process. Because of the extra information that may have been recorded after the manual merge operation, it may be possible to form more unified profiles than were originally present before the merge operation. In this way, the records may be unmerged and one or more profiles may be created, while still preserving any changes made to the system state after the manual merge command was issued.

In some examples, an application server or customer data platform may receive a request to merge a first unified profile with a second unified profile, each of which may have a profile identifier and a set of records associated therewith. The sets of records associated with each unified profile may have been grouped according to a set of rules for an automated match process. In some examples, the application server or customer data platform may merge, based on the merge request, the first unified profile and the second unified profile to generate a merged unified profile. The merged unified profile may include a merged set of records that include the sets of records that were associated with the first unified profile and the second unified profile. The merged unified profile may be associated with the profile identifier of the first unified profile. In some examples, the application server or customer data platform may generate an association between the first set of records and the second set of records based on the merging. In some examples, the application server or customer data platform may receive a request to undo the merging. Based on this request, the application server or customer data platform may ingest the merged set of records into the automated match process by applying the set of rules for the automated match process. As part of the ingesting, the application server or customer data platform may exclude the generated association between the second set of records and the first set of records from the automated match process. By undoing a manual merge of records in this way, technical problems in conventional undo approaches are avoided. In conventional techniques, a simple undo function that restores a previous state of a system loses changes made after the manual merge was done. However, since the approaches described herein take such changes into account during the undo merge process, such technical problems are reduced or eliminated.

In some examples, the application server or customer data platform may identify a change in an automated match system, the change occurring after merging the first unified profile with the second unified profile and before the request to undo the merging. In some examples, the application server or customer data platform may identify, based on the ingesting, one or more re-clustered sets of records produced by the automated match process. In some examples, the automated match process may produce the one or more re-clustered sets of records based on the change to the automated match system.

In some examples, the application server or customer data platform may periodically perform an analysis of the set of rules for the automated match process and the first and second set of records. In some examples, the application server or customer data platform may identify one or more recommendations for merging or unmerging records or profiles based on the analysis. In some examples, the application server or customer data platform may generate a prompt to merge or unmerge records or profiles based on the analysis and the identifying. The application server or customer data platform may support a user interface for receiving command or displaying prompts (among other functions or information) and, in some examples, receiving, via the user interface, a request to merge or receiving, via the user interface, a request to undo the merging, may be based on the prompt.

Aspects of the disclosure are initially described in the context of an environment supporting an on-demand database service. Aspects of the disclosure are then described with a system diagram, a merging scheme, a merge undo schemes, and a process flow. Aspects of the disclosure are further illustrated by and described with reference to apparatus diagrams, system diagrams, and flowcharts that relate to evaluating clustering in case of data stewardship actions.

FIG. 1 illustrates an example of a system 100 for cloud computing that supports evaluating clustering in case of data stewardship actions in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may receive a request (e.g., from the cloud clients 105) to merge a first unified profile with a second unified profile, where the first unified profile and the second unified profile may each be associated with a set of records and a profile identifier. In some examples, the sets of records associated with each unified profile may have been grouped according to a set of rules for an automated match process. In some examples, the cloud platform 115 may merge, based on the merge request, the first unified profile and the second unified profile to generate a merged unified profile. The merged unified profile may include a merged set of records that include the sets of records that were associated with the first unified profile and the second unified profile. The merged unified profile may be associated with the profile identifier of the first unified profile. In some examples, a profile identifier assigned to the merged unified profile may be based on a number of contact points, or records, or some other comparative characteristic between the first and second unified profiles. In some examples, the cloud platform 115 may generate an association between the first set of records and the second set of records based on the merging. In some examples, the cloud platform 115 may receive a request (e.g., from the cloud clients 105) to undo the merging. Based on this request, the cloud platform 115 may ingest the merged set of records into the automated match process by applying the set of rules for the automated match process. As part of the ingesting, the cloud platform 115 may exclude the generated association between the second set of records and the first set of records from the automated match process.

In some approaches, an undo of a first change in the system (e.g., a manual merge of records) may simply restore a state of the entire system, which may exclude or erase any other alterations to the system that were performed after the first change in the system. For example, if a simple undo operation is performed that only restores a state of the database system from an earlier time, additional changes, configurations, associations, dependencies, records, or other information implemented or modified after the time of the manual merge may be lost, and the restored state of the database system 200 would be stale. Thus, a technical problem is present in that a manual merge of records needs to be undone without affecting changes to the system made after the manual merge.

The subject matter of this disclosure reduces or avoids such deficiencies by re-ingesting the records that were manually merged back into the same match and reconcile process that initially grouped the records into profiles, while excluding or ignoring any association or dependency that was created as a result of the manual merge. As such, the manual merge may be undone, while, at the same time, additional changes made or dependencies created may be maintained, and the state of the system may still be fresh. In some cases, because the additional changes are maintained, the re-grouping of the records may be different than the initial grouping. However, this may be desirable, because such a result reflects the updated state of the system that takes into account all changes made after the manual merge. Thus, the subject matter of this disclosure may reduce or eliminate the deficiencies of conventional approaches.

In one example, a data steward (e.g., a user or administrator with permissions to manually manipulate profiles and records within the cloud platform 115) may decide that a first unified profile and a second unified profile (each of which may have been formed through an automated match and reconciliation process as described herein) may correspond to a single user, and that the first unified profile and the second unified profile should be merged. The data steward may then transmit a merge request, via the cloud clients 105 to the cloud platform 115. Upon receiving the merge request, the cloud platform 115 may then create a merged unified profile that is associated with a merged set of records. Later, the data steward or user may decide that the manual merge that created the merged unified profile and the merged set of records should be undone, and may submit a merge undo request (e.g., from the cloud clients 105 to the cloud platform 115). To undo the merge process, the cloud platform 115 may split the merged set of records into individual records and remove an association between the merged set of records and the merged unified profile. In order to effectively undo the merge, the cloud platform 115 may ingest the individual records into the automated match and reconciliation process to re-cluster the individual records. In some examples, the individual records may be re-clustered into a first re-clustered set of records and a second re-clustered set of records. The first re-clustered set of records may be associated with a first re-clustered profile, and the second re-clustered set of records may be associated with a second re-clustered profile. In this way, by running the merged records back through the automated match and reconciliation process, the manual merge performed by the data steward may be undone without affecting any additional changes that should be maintained in order to keep the system in a fresh, updated state.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2A:
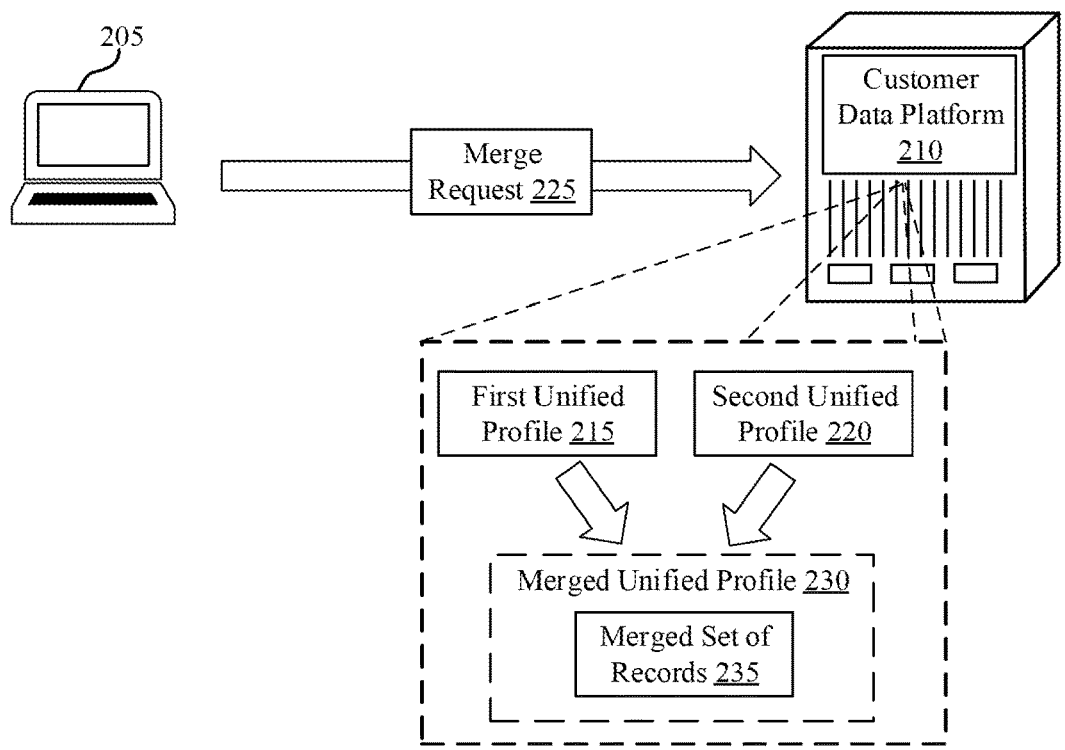
FIGS. 2A and 2B illustrate an example of a database system that supports evaluating clustering in case of data stewardship actions in accordance with aspects of the present disclosure.
Figure 2B:
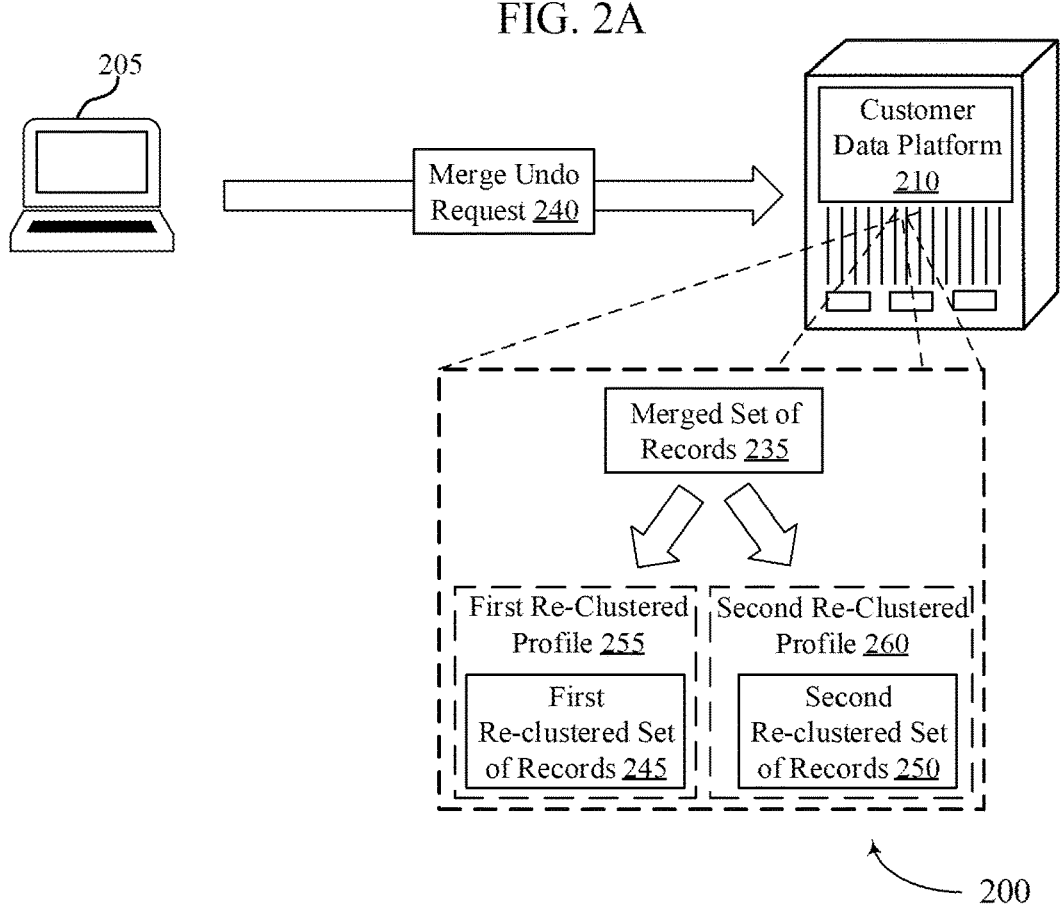

FIGS. 2A and 2B illustrate an example of a database system 200 that supports evaluating clustering in case of data stewardship actions in accordance with aspects of the present disclosure. The database system 200 may include a client 205. The client 205 may be any appropriate device capable of communicating with other devices such as a laptop computer, desktop computer, server, virtual machine, or other device. In some examples, the client 205 is associated with a tenant of a multi-tenant database system. In some examples, the client 205 may communicate with a customer data platform 210 that is also associated with the multi-tenant database system.

In some examples, a cloud platform may support an application or platform (e.g., the customer data platform 210) that includes functionality for ingesting data objects (e.g., user records) from different data sources (e.g., web browser, point of sale transaction, etc.) and performing queries, segmentation, and other analytic functions related to the data objects. A data object may include fields (e.g., phone number, address, email, nickname) associated with a contact. In some cases, the customer data platform 210 may receive multiple data objects with different or conflicting field values for a single contact. For example, the customer data platform 210 may receive a first data object corresponding to an interaction between a tenant and a contact at a kiosk and may receive a second data object corresponding to an interaction between the tenant and the contact at a mobile application. In such an example, the first data object may include a first email address and the second data object may include a second email address that is different from the first email address. The customer data platform 210 may store two separate records or data objects corresponding to these two interactions even though they correspond to a single individual, user, or contact.

To unify, associate, or group these separate records or data objects, the customer data platform 210 may perform an automated match process (e.g., referred to herein as an automated match and reconciliation process) by identifying a set of data objects with matching field values and clustering the identified set of data objects into a unified data object (e.g., referred to as a unified profile). The customer data platform 210 may perform the automated match process according to a configuration associated with the tenant, and each tenant may have the same or different configurations. The configuration may include a set of match rules and a set of reconciliation rules that indicate criteria for identifying data objects with matching field values and combining the identified data objects into a unified profile. The customer data platform 210 may perform the automated match process to create a unified profile, and a set of records may also be associated with the unified profile as part of the automated match process. To generate the unified profile, the customer data platform 210 may select a value for each field of the unified profile from corresponding field values of the identified set of data objects according to the configuration (e.g., according to the reconciliation rules).

FIG. 2A illustrates an example of a manual merge process. In some examples, a data steward (e.g., a user or administrator) may decide that a first unified profile 215 and a second unified profile 220 (each of which may have been formed through an automated match and reconciliation process as described herein) may correspond to a single user, and that the first unified profile 215 and the second unified profile 220 should be merged. In some examples, the customer data platform 210 may also periodically analyze one or more rules or configurations used for the automated match process. The customer data platform 210 may also analyze one or more records currently stored in the customer data platform 210 or in storage associated with the database system 200. Based on such an analysis, the customer data platform 210 may identify one or more recommendations for clustering of records (e.g., to form a unified profile) or merging of unified profiles (e.g., to form a merged unified profile). Additionally, or alternatively, the customer data platform 210 may generate one or more prompts to merge records or profiles based on the analysis and the identification of merging recommendations. In some examples, the merge request 225 may be based on the one or more generated prompts to merge records or profiles. In some examples, such analysis, identification, and prompt generation may be performed autonomously, without input from an administrator, data steward or user.

In some examples, (whether the data steward is prompted by the system or the data steward independently takes action) the data steward may, via the client 205, transmit a merge request 225 to the customer data platform 210. The merge request 225 may specify profiles, records, or both, that are to be merged as a result of the merge request 225. Upon receiving the merge request 225, the customer data platform 210 may then create a merged unified profile 230 that is associated with a merged set of records 235. In some examples, the merged set of records 235 may include the records originally associated with the first unified profile 215 and the second unified profile 220. In some examples, an association may be established between the merged set of records 235 and the merged unified profile 230. For example, the merged unified profile 230 may be a profile for a particular person or company, and the merge set of records 235 may be records that contain or indicate contact information that is believed to be contact information for the particular person or company. Thus, the merged set of records 235 may be associated with the merged unified profile 230 such that a user, administrator, client, or other entity or system may determine or recognize that the merged set of records 235 belongs to a particular person or company, which may be represented by the merged unified profile 230.

FIG. 2B illustrates an example of a merge undo process that may undo the manual merge process described in relation to FIG. 2A. In some examples, a data steward or user may decide that the manual merge that created the merged unified profile 230 and the merged set of records 235 should be undone, and may submit a merge undo request 240 from the client 205 to the customer data platform 210. In some examples, the customer data platform 210 may also periodically analyze one or more rules used for the automated match process. The customer data platform 210 may also analyze one or more records currently stored in the customer data platform 210 or in storage associated with the database system 200. Based on such an analysis, the customer data platform 210 may identify one or more recommendations for unmerging (or undoing of a merge) of records or profiles. Additionally, or alternatively, the customer data platform 210 may generate a prompt to unmerge records or profiles (or undo a merge of records) based on the analysis and the identification of merging recommendations. In some examples, such analysis, identification, and prompt generation may be performed autonomously, without input from an administrator, data steward or user.

To undo the merge process, the customer data platform 210 may split the merged set of records 235 into individual records and remove an association between the merged set of records 235 and the merged unified profile 230. For example, by removing such an association, a user of the application server or customer data platform 210 may recognize or determine that at least a portion of the merged set of records 235 may not refer to the same person as other records in the merged set of records 235. That is, not all of the records in the merged set of records 235 may contain contact information for the person or contact to whom the merged unified profile 230 may refer or correspond. Removing the association between the merged set of records 235 and the merged unified profile 230 may indicate such a fact in the system. In order to effectively undo the merge, the customer data platform 210 may ingest the individual records into the automated match and reconciliation process to re-cluster the individual records. In some examples, the individual records may be re-clustered into a first re-clustered set of records 245 and a second re-clustered set of records 250. The first re-clustered set of records 245 may be associated with a first re-clustered profile 255, and the second re-clustered set of records 250 may be associated with a second re-clustered profile 260. In this way, by running the merged records back through the automated match process, the manual merge performed by the data steward may be undone. Were a simple undo operation performed that only restores a state of the database system 200 from an earlier time (e.g., reinstating the first unified profile 215 and the second unified profile 220 as they were at the time the merge command was issued), additional changes, configurations, records, or other information implemented or modified after the time of the manual merge may be lost, and the restored state of the database system 200 would be stale. That is, at the time of issuing the request to undo the merge 240, the state of the database system 200 may have been altered such that restoring the first unified profile 215 and the second unified profile 220 as they previously were may not be an accurate reflection of the current state of the database system 200.

Figure 3:
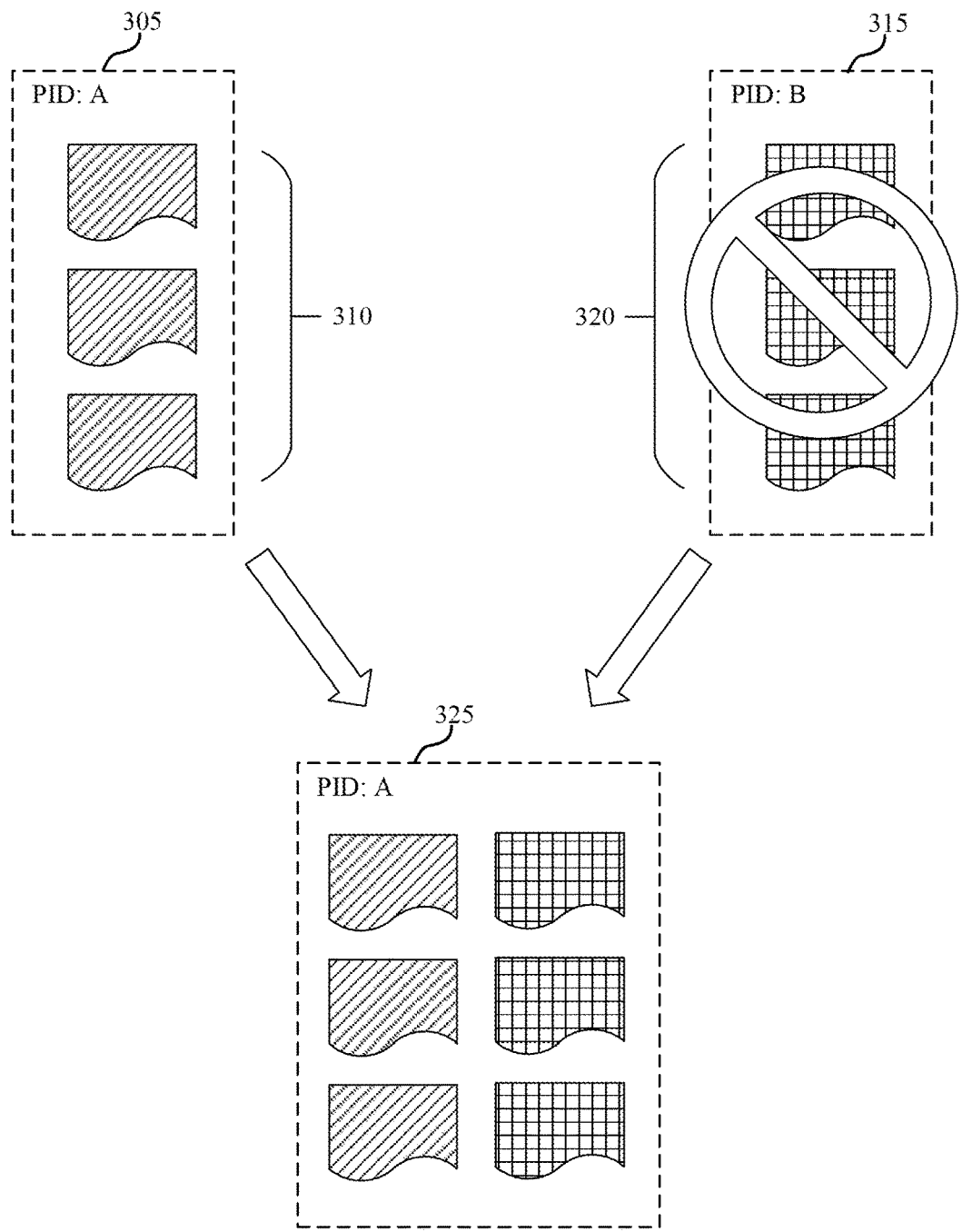
FIG. 3 illustrates an example of a manual merge scheme that supports evaluating clustering in case of data stewardship actions in accordance with aspects of the present disclosure.
Figure 3:
Figure 3:

FIG. 3 illustrates an example of a manual merge scheme 300 that supports evaluating clustering in case of data stewardship actions in accordance with aspects of the present disclosure. In some examples, a data steward may decide that one or more records, profiles, or other data objects should be merged, and may initiate a manual merge process. In some examples, the customer data platform (e.g., the customer data platform 210 discussed in relation to FIG. 2 or the customer data platform 410 discussed in relation to FIG. 4) may also periodically analyze one or more rules used for the automated match and reconciliation process. The customer data platform 210 may also analyze one or more records currently stored in the customer data platform 210 or in storage associated with the database system 200. Based on such an analysis, the customer data platform 210 may identify one or more recommendations for merging of records or unified profiles. Additionally, or alternatively, the customer data platform 210 may generate one or more prompts to merge records or profiles based on the analysis and the identification of merging recommendations. In some examples, the merge request 225 may be based on the one or more generated prompts to merge records or profiles. In some examples, such analysis, identification, and prompt generation may be performed autonomously, without input from an administrator, data steward or user.

The manual merge process may be performed by an application or platform (e.g., the customer data platform 210 described in relation to FIG. 2) that includes functionality for ingesting data objects (e.g., user records) from different data sources (e.g., web browser, point of sale transaction, etc.) and performing queries, segmentation, and other analytic functions related to the data objects. The application or platform may contain a first unified profile 305, and a second unified profile 315 (either or both of which may have been formed through an automated match and reconciliation process as described herein). The first unified profile 305 may be associated with first profile records 310, and the second unified profile 315 may be associated with second profile records 320.

In some examples, a data steward (e.g., a user or administrator) may decide that the first unified profile 305 and the second unified profile 315 should be merged, since, in the judgment of the data steward, they correspond to a single user, person, company, or contact. As such, the data steward may initiate a manual merge request (e.g., the merge request 225 as described in relation to FIG. 2). In some examples, to run the manual merge process, the application or platform (e.g., the customer data platform 210) may associate the first profile records 310 and the second profile records 320 with a single unified profile (e.g., the first unified profile 305), and may further disassociate the second profile records 320 from the second unified profile 315. In some examples, a profile that is not associated with any records after the manual merge process may be deleted (e.g., the second unified profile 315 may be deleted).

As shown in FIG. 2, the first unified profile 305 may have a profile identifier (PID) of A, and the second unified profile 315 may have a profile identifier of B. As part of the manual merge process, the merged unified profile 325 may also receive a PID. In some examples, the PID of the merged unified profile 325 may be one of the PIDs of the profiles that were merged to form the merged unified profile 325 (e.g., the PID A of the first unified profile 305, or the PID B of the second unified profile 315). A determination as to which PID to use may be based on a number of contact points of each of the profiles. A contact point may be a piece of information (e.g. a unique piece of information) that may be used by a user or client to contact the person or entity to whom a unified profile or a group of records may refer. In some examples, a contact point may indicate a rating of how useful a piece of contact information is (e.g. a more recently updated phone number may be "worth" more contact points than a less recently updated phone number). As an example, if the first unified profile 305 has five contact points (e.g. an address, a phone number, two emails, and a social media username), and the second unified profile 315 has only three contact points (e.g. a phone number, an email address, and a website address), then the PID from the first unified profile 305 (PID A) may be used for the merged unified profile 325.

Figure 4:
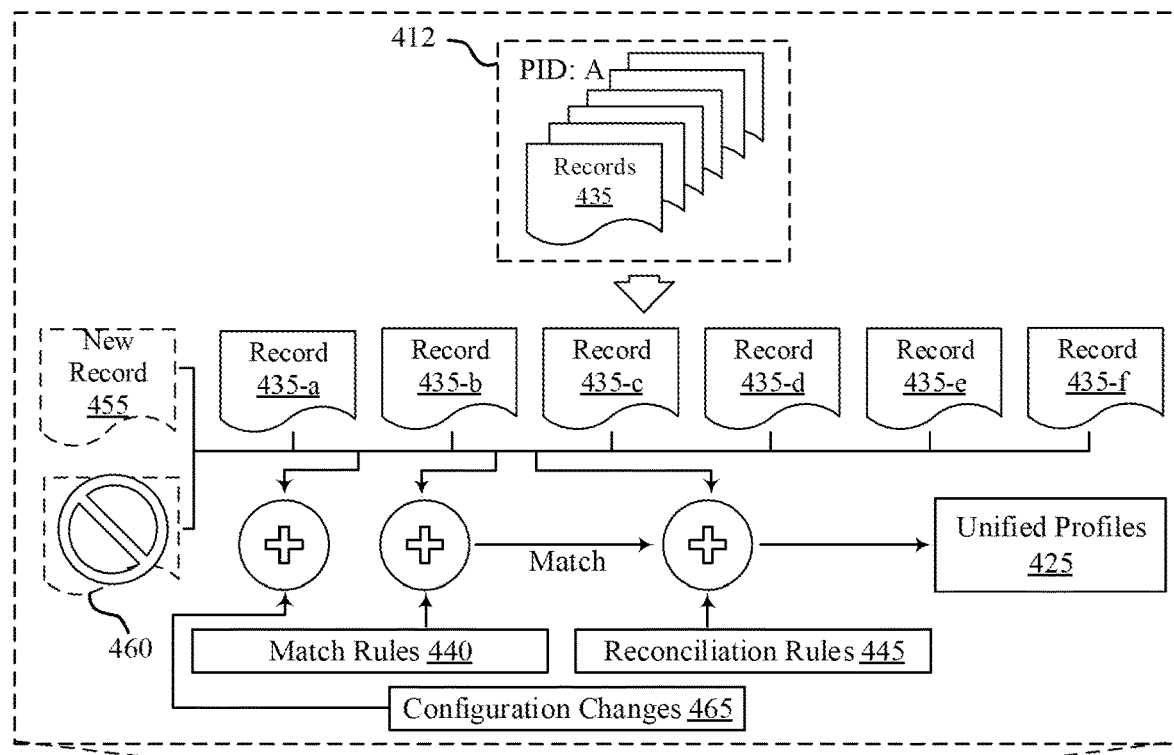
FIG. 4 illustrates an example of a database system that supports evaluating clustering in case of data stewardship actions in accordance with aspects of the present disclosure.
Figure 4:
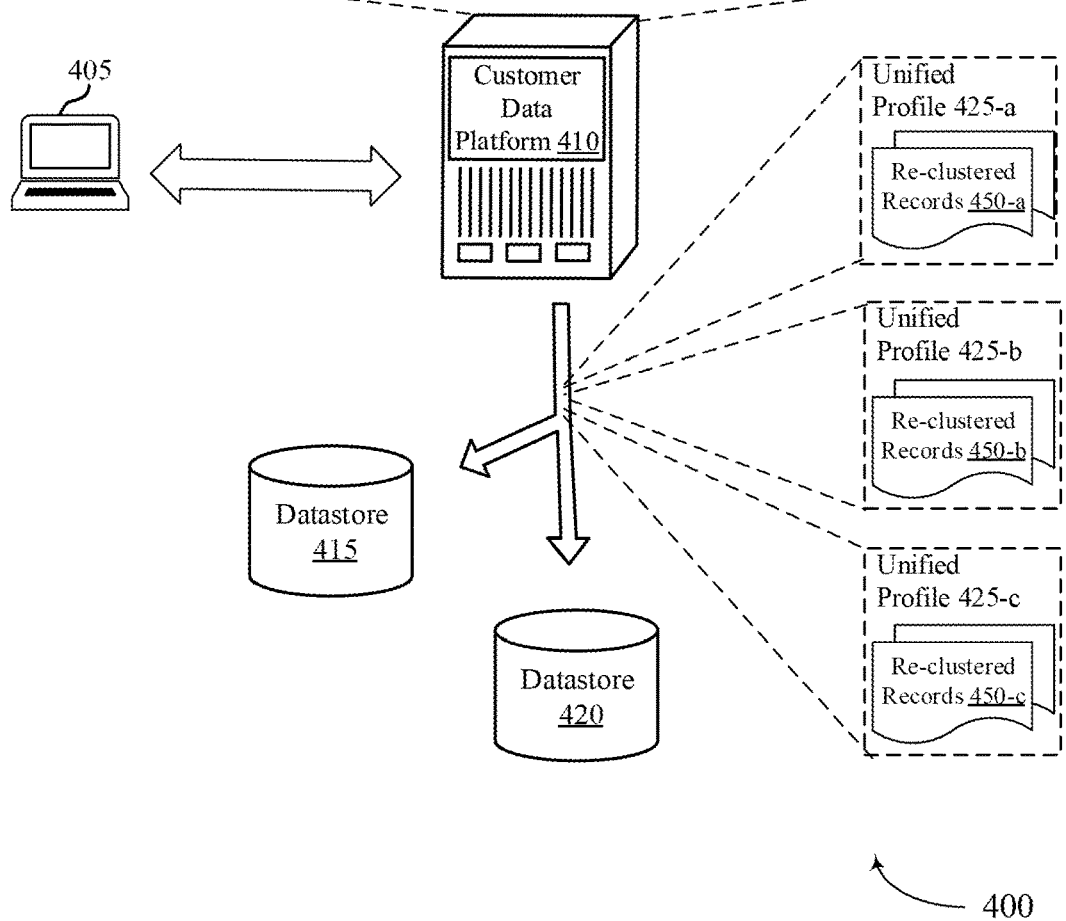

FIG. 4 illustrates an example of a database system 400 that supports evaluating clustering in case of data stewardship actions in accordance with aspects of the present disclosure. After a manual merge has been performed, a data steward, administrator, or user may decide that the manual merge that created a merged unified profile 412 should be undone. In some examples, the customer data platform 410 may also periodically analyze one or more rules used for the automated match process. The customer data platform 410 may also analyze one or more records currently stored in the customer data platform 410 or in storage associated with the database system 200. Based on such an analysis, the customer data platform 410 may identify one or more recommendations for unmerging (or undoing of a merge) of records or profiles. Additionally, or alternatively, the customer data platform 410 may generate a prompt to unmerge records or profiles (or undo a merge of records) based on the analysis and the identification of merging recommendations. In some examples, a customer data platform 410 may analyze records, rules, and profiles without the direction of a user or data steward, and may automatically produce prompts or suggestions for a user, administrator, or data steward to act upon.

The merged unified profile 412 may be an example of a merged unified profile 230 discussed in relation to FIG. 2, or a merged unified profile 325 as described in relation to FIG. 3. The data steward may then send an unmerge request, via the client 405 to the customer data platform 410 to perform the undo of the merge.

The database system 400 may include a customer data platform 410, which may be supported by a cloud platform 115 as described herein with reference to FIG. 1, and which may be an example of a server (e.g., an 115 application server or a database server), an application or service running on a server, or the like. The database system 400 may also include a first datastore 415 and a second datastore 420, which may be examples of a data center 120 as described herein with reference to FIG. 1. The customer data platform 410 may configure a cluster of computing resources (e.g., servers, virtual machines, cloud resources) to perform an automated match job (e.g., also referred to as an automated match and reconciliation job) for a client 405 of the customer data platform 410. The match job may include identifying a set of records 435 with matching field values, generating one or more unified profiles 425 from the set of records 435, and storing the one or more unified profiles 425 in the first datastore 415 and the second datastore 420.

In some cases, the customer data platform 410 may ingest records 435 from multiple different data sources. For example, the records 435 may be records that were previously merged (e.g., the merged set of records 235 described in relation to FIG. 2 or the first profile records 310 and the second profile records 320 described in relation to FIG. 3) through a manual merge process performed by a data steward (e.g., the manual merge process described in relation to FIGS. 2 and 3). The records 435 may be examples of data records that are stored in a datastore and may contain structure or unstructured data, including fields or attributes, and values for one or more of the fields or attributes. The records 435 may be associated with a tenant of a multi-tenant database system, and the records 435 may correspond to an interaction between the tenant and a contact of the tenant. For example, the record 435-a may correspond to an interaction involving a contact named Angela Beckham. Similarly, the record 435-c may correspond to an interaction involving a contact named Adam Cook. A record 435 may include a set of fields and a corresponding set of values for the fields. The set of fields may include one or more name fields (e.g., first name, last name), one or more contact information fields (e.g., phone number, email address), one or more address fields (e.g., home address fields, business address fields), and one or more fields related to the interaction from which the record 435 was generated. For example, the record 435-b may include one or more name fields (e.g., First Name, Last Name), one or more contact information fields (e.g., Phone, Email), and one more fields related to the interaction (e.g., Data Source, Date).

In some cases, records 435 may have one or more fields with matching values and one or more fields with mismatching values. For example, the first name and last name fields of the records 435-a and 435-b may have matching values (e.g., Angela, Beckham) but the email address fields of the records may 435-a and 435-b have mismatching values (e.g., ab3@gmail.com, abeck@live.com). In some cases, the records 435-a and 435-b may correspond to the same contact. In some other cases, the records 435-a and 435-b may correspond to different contacts with the same first name and last name fields.

In accordance with the techniques described herein, the database system 400 may support performing an undo of a manual merge of records by ingesting the individual records through an automated match job or process for the tenant based on a set of records 435 that were previously merged by a manual merge process (some or all of which may have matching field values), and generating one or more unified profiles 425 from the set of records 435. In some examples, the records 435 may be split into individual records (e.g., record 435-a, record 435-b, record 435-c, record 435-d, record 435-e, and record 435-f). In some examples, such splitting may be done by removing an association between the records 435-a through 435-f and the merged unified profile 412. For example, in a unified profile (e.g. the merged unified profile 412), each of the records (e.g. records 435-a through 435-f) may each be associated with the unified profile to indicate that the information in the records may refer to a particular person or contact to whom the unified profile corresponds or represents. By removing the associations, the database system 400 may indicate that at least a portion of the information in the records 435-a through 435-f (or the records themselves) may not refer to the particular person or contact associated with the unified profile (e.g. the merged unified profile 412). A value for each field of the one or more unified profiles 425 may be selected from corresponding field values of the records 435-a through 435-f. The customer data platform 410 may generate a mapping between the one or more unified profiles 425 (e.g., a primary key associated with the one or more unified profiles 425 or a field of the one or more unified profiles 425) and the records 435-a through 435-f. (e.g., a corresponding primary key associated with each record 435 of the set of records 435 from which the one or more unified profiles 425 was generated). For example, as a result of running the undo of a manual merge by ingesting individual records through the automated match and reconciliation process, the records mapped or associated with unified profile 425-a may be the re-clustered records 450-a, the records mapped or associated with unified profile 425-b may be the first re-clustered records 450-b, and the records mapped or associated with unified profile 425-c may be the first re-clustered records 450-c. The customer data platform 410 may store the one or more unified profiles 425 and the mapping in a first datastore 415 (e.g., a relational database system) and a second datastore 420 that is different than the first data store 415 (e.g., a non-relational database system).

In some examples, the customer data platform 410 may optionally take into account additional records that were not part of the manual merge process (e.g., records not forming part of the records 235). For example, after the manual merge process, a new record 455 may have been created that may be relevant to the records 435 (e.g., new record 455 may represent information about a contact for which another record may have additional information, and such records should be merged into a single profile). As such, as part of the merge undo process, additional records that did not earlier exist or were not earlier relevant (e.g., because of a change in information in the record) to the initial profiles or the merged unified profile may be considered in the automated match and reconciliation process and may be associated with one or more of the unified profiles 425.

Similarly, a record, profile, or other information that may have been deleted from the system (e.g., deleted record 460) may also be relevant to the automated match and reconciliation process, and the customer data platform 410 may optionally take such a deleted record 460 into account as part of the match process performed as part of the merge undo process. For example, the deleted record 460 may contain information that was used in a previous match and reconciliation process to initially form the profiles that were manually merged (e.g., the first unified profile 215 and the second unified profile 220 as discussed in relation to FIG. 2, or the first unified profile 305 and the second unified profile 315 as discussed in relation to FIG. 3). During the automated match and reconciliation process undertaken and part of the merge undo process, this deleted information previously contained in the deleted record 460 may no longer be present, and as such, the determination, selection, or identification of associations to be created may be subsequently altered.

In some examples, the customer data platform 410 may perform the automated match and reconciliation job according to a configuration associated with the tenant. The configuration may include a set of match rules 440 for identifying records 435 with matching field values and a set of reconciliation rules 445 for generating one or more unified profiles 425 from the identified records 435. For example, the set of match rules 440 may include an indication to identify records 435 with matching values for one or more fields. Accordingly, the customer data platform 410 may identify a set of records 435 with matching values for the indicated one or more fields and may generate one or more unified profiles 425 from the set of records 435. The indicated one or more fields of the one or more unified profiles 425 may include the matching values from the set of records 435. If, for example, the set of records 435 has mismatching values for fields other than the indicated one or more fields, the customer data platform 410 may use the reconciliation rules 445 to select a value for the other fields of the one or more unified profiles 425 from the mismatching values of the set of records 435.

In addition to new or deleted records, a change in configuration of the database system 400 may have also occurred after the manual merge process. For example, a one or more configuration changes 465 may have occurred after the merged unified profile 412 was formed. Such configuration changes may include changes in data formats, rules (e.g., a change in the match rules or a change in the reconciliation rules, or both), procedures, backups, orders of operations, or any variety of other configuration changes that may be made in a database system 400. By taking into account the configuration changes 465 as part of the automated match and reconciliation process performed as part of the merge undo process, the manual merge may be undone by taking into account the configuration changes.

In some examples, the association between the records 435 and the merged unified profile 412 may be excluded from the match rules 440, reconciliation rules 445, or both. By excluding such an association, the match and reconcile process may therefore regroup the various records 435 while ignoring the effects of the manual merge process, thereby undoing the merge while maintaining any updates or changes to the system that may have occurred after the manual merge process. In addition, by excluding such an association, the database system 400 may indicate that one or more of the various records 435 may not refer to the particular person or contact associated with the merged unified profile 412 (e.g. that at least a portion of the contact information stored in the various records 435 may not be contact information for the person or contact associated with the merged unified profile 412).

In some examples, the customer data platform 410 may perform the automated match and reconciliation job in response to determining that a trigger condition related to the tenant has been satisfied. The trigger condition may include an merge undo request (e.g., the merge undo request 240 described in relation to FIG. 2), an enablement condition, a repeated failure threshold, a daily quota, a mapping condition, a new data condition, a mapping update condition, or a combination thereof. If the customer data platform 410 determines that the trigger condition has been satisfied, the customer data platform 410 may invoke the automated match and reconciliation process for the tenant. Otherwise, the customer data platform 410 may refrain from performing the match and reconciliation process for the tenant (e.g., by skipping the match process until a next scheduled time or trigger event occurrence).

The customer data platform 410 may generate a mapping between a primary key associated with the one or more unified profiles 425 and a corresponding primary key associated with each record 435 of the set of records 435 from which the one or more unified profiles 425 was generated. The unified profile and the mapping may have a one-to-many (e.g., 1:N) relationship, whereas each record 435 of the set of records 435 may have a one-to-one (e.g., 1:1) relationship with the mapping. Stated another way, each record 435 may be associated with a single mapping, whereas the one or more unified profiles 425 may be associated with multiple mappings. The customer data platform 410 may use the mapping to retrieve information (e.g., field values) associated with a record 435 of the set of records 435 via the one or more unified profiles 425, as described herein with reference to FIG. 6.

The customer data platform 410 may store the one or more unified profiles 425 in a first relational datastore 415 and a second non-relational datastore 420. The first relational datastore 415 may support specific queries (e.g., human-time queries), while the second non-relational datastore 420 may support low latency queries. The second non-relational datastore 420 may use a set of keys (e.g., partition and sort keys) and a set of indices to efficiently access information (e.g., field values) associated with the stored one or more unified profiles 425. The second non-relational datastore 420 may assign the one or more unified profiles 425 to a cluster with other unified profiles 425 that are frequently queried together, such that information associated with unified profiles 425 in the cluster may be efficiently retrieved for subsequent queries.

Figure 5:
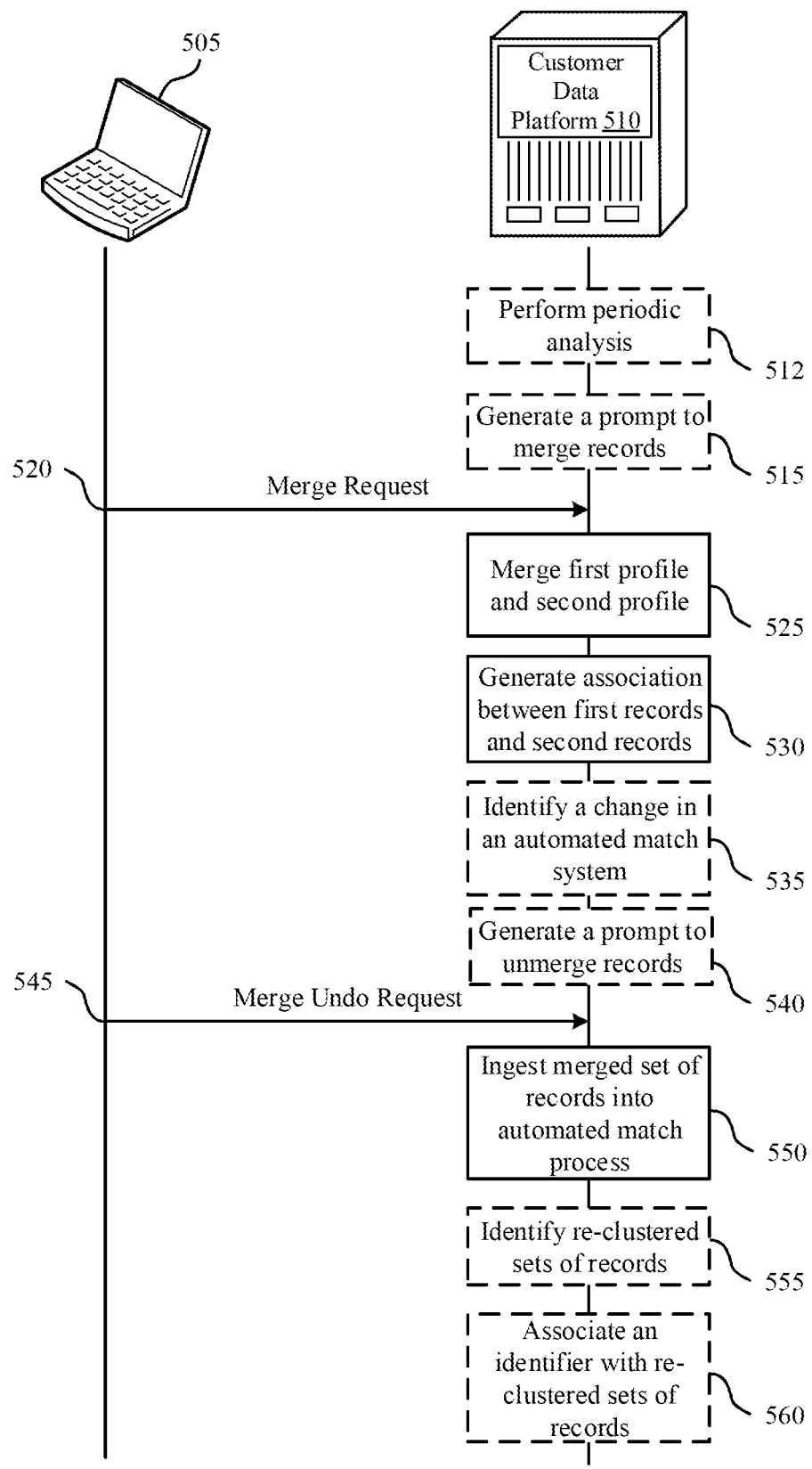
FIG. 5 illustrates an example of a process flow that supports evaluating clustering in case of data stewardship actions in accordance with aspects of the present disclosure.

FIG. 5 illustrates an example of a process flow 500 that supports evaluating clustering in case of data stewardship actions in accordance with aspects of the present disclosure.

The process flow 500 may be implemented by a client 505 and a customer data platform 510. The client 505 may be an example of a cloud client 105 as described herein with reference to FIG. 1. The customer data platform may be an example of a customer data platform 210 and 410 as described herein with reference to FIGS. 2 and 4. In accordance with the process flow 500, the customer data platform 510 may perform a match undo process for the client 505. Additionally, alternative examples of the process flow 500 may be implemented, where some operations may be performed in a different order than described or may include not performed at all. In some examples, operations may include additional features not mentioned below, or further processes may be added.

At 512, the customer data platform 510 may periodically perform an analysis of the set of rules for the automated match process (e.g., the match rules 440 discussed in relation to FIG. 4) and the first and second set of records. In some examples, the customer data platform 510 may identify one or more recommendations for merging or unmerging records or profiles based on the analysis.

At 515, the customer data platform 510 may generate a prompt to merge records based on the analysis and the identifying. In some examples, receiving, via the user interface, a request to merge may be based on the prompt to merge the records.

At 520, the customer data platform 510 may receive, via a user interface, a request (e.g., the merge request 225 discussed in relation to FIG. 2) to merge a first unified profile with a second unified profile. The first unified profile (e.g., the first unified profile 215 discussed in relation to FIG. 2) may have a first profile identifier and a first set of records that may include grouped according to a set of rules for an automated match process, and the second unified profile (e.g., the second unified profile 220 discussed in relation to FIG. 2) may have a second profile identifier and a second set of records that may include grouped according to the set of rules for the automated match process. For example, the merge request may be an example of merge request 225 discussed in relation to FIG. 2, and the first unified profile and the second unified profile may be examples of the first unified profile 215 and the second unified profile 220, respectively, as discussed herein in relation to FIG. 2.

At 525, the customer data platform 510 may merge, based on the request to merge, the first unified profile with the second unified profile to generate a merged unified profile (e.g., the merged unified profile 230 discussed in relation to FIG. 2 or the unified profiles 425 discussed in relation to FIG. 4) including a merged set of records including the first set of records and the second set of records, the merged unified profile having the first profile identifier. In some examples, the customer data platform 510 may disassociate the first profile identifier from the first set of records, and disassociate the second profile identifier from the second set of records.

At 530, the customer data platform 510 may generate an association between the second set of records and the first set of records based on the merging. In some examples, the customer data platform 510 may associate the first profile identifier with the merged unified profile based on a number of contact points of the first unified profile being at least equal to a number of contact points of the second unified profile.

At 535, the customer data platform 510 may identify a change in an automated match system, the change occurring after merging the first unified profile with the second unified profile and before the request to undo the merging. In some examples, the customer data platform 510 may identify, based on the ingesting, one or more re-clustered sets of records produced by the automated match process. In some examples, the automated match process may produce the one or more re-clustered sets of records based on the change to the automated match system. In some examples, the change to the automated match system may include an addition of a record to the merged set of records (e.g., the new record 455 discussed in relation to FIG. 4). In some examples, the change to the automated match system may include a deletion of a record in the merged set of records (e.g., the deleted record 460 discussed in relation to FIG. 4). In some examples, the change to the automated match system may include a change to the set of rules for the automated match process.

At 540, the customer data platform 510 may generate a prompt to unmerge records based on the analysis and the identifying. In some examples, receiving, via the user interface, a request to unmerge may include based on the prompt.

At 545, the customer data platform 510 may receive, via the user interface, a request to undo the merging (e.g., the merge undo request 240 discussed in relation to FIG. 2). In some examples, the request to undo the merging may be based on the prompt to unmerge records.

At 550, the customer data platform 510 may ingest, based on the request to undo the merging, the merged set of records into the automated match process by applying the set of rules for the automated match process and excluding the generated association between the second set of records and the first set of records. In some examples, ingesting the merged set of records into the automated match process may include retrieving, from an input record storage area, one or more input records associated with one or more records comprised in the merged set of records, deleting the merged set of records, and ingesting the one or more input records into the automated match process. In some examples, the customer data platform 510 may disassociate the first profile identifier from the merged set of records and disassociate, from the first profile identifier, one or more references to the first profile identifier.

At 555, the customer data platform 510 may identify a first re-clustered set of records (e.g., the first re-clustered set of records 245 discussed in relation to FIG. 2) from the one or more re-clustered sets of records based on a number of contact points in the first re-clustered set of records.

At 560, the customer data platform 510 may associate a re-clustered profile identifier with each of the one or more re-clustered sets of records (e.g., the first re-clustered set of records 245 and the second re-clustered set of records 250 discussed in relation to FIG. 2). In some examples, associating a re-clustered profile identifier with each of the one or more re-clustered sets of records may include associating the first profile identifier with the first re-clustered set of records based on the number of contact points in the first re-clustered set of records. In some examples, the number of contact points in the first re-clustered set of records may include at least equal to a number of records in each of the one or more re-clustered sets of records. In some examples, the customer data platform 510 may display, via the user interface, information associated with the one or more re-clustered sets of records. In some examples, the information may include one or more of the re-clustered profile identifiers, the one or more re-clustered sets of records, or a combination thereof.

Figure 6:
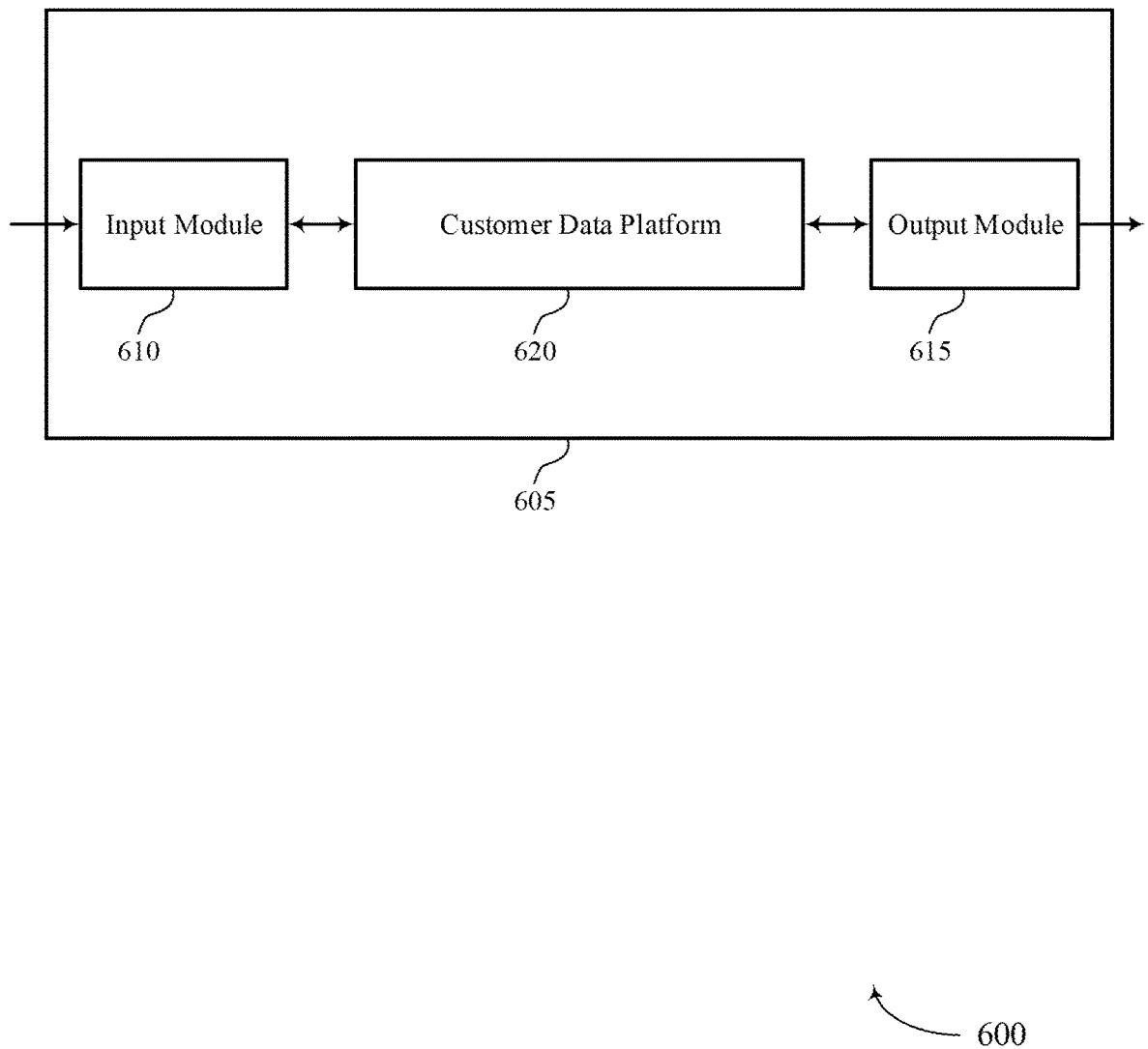
FIGS. 6 and 7 show block diagrams of devices that support evaluating clustering in case of data stewardship actions in accordance with aspects of the present disclosure.

FIG. 6 shows a block diagram 600 of a device 605 that supports evaluating clustering in case of data stewardship actions in accordance with aspects of the present disclosure. The device 605 may be an example of aspects of an application server as described herein. The device 605 may include an input module 610, an output module 615, and a customer data platform 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the customer data platform 620 to support evaluating clustering in case of data stewardship actions. In some cases, the input module 610 may be a component of an I/O controller 910 as described with reference to FIG. 9.

The output module 615 may manage output signals for the device 605. For example, the output module 615 may receive signals from other components of the device 605, such as the customer data platform 620, and may transmit these signals to other components or devices. In some specific examples, the output module 615 may transmit output signals for display in a user interface, for storage in a database or data store, for further processing at a server or server cluster, or for any other processes at any number of devices or systems. In some cases, the output module 615 may be a component of an I/O controller 910 as described with reference to FIG. 9.

The customer data platform 620, the input module 610, the output module 615, or various combinations thereof or various components thereof may be examples of means for performing various aspects of evaluating clustering in case of data stewardship actions as described herein. For example, the customer data platform 620, the input module 610, the output module 615, or various combinations or components thereof may support a method for performing one or more of the functions described herein.

In some examples, the customer data platform 620, the input module 610, the output module 615, or various combinations or components thereof may be implemented in hardware (e.g., in communications management circuitry). The hardware may include a processor, a DSP, an ASIC, a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the customer data platform 620, the input module 610, the output module 615, or various combinations or components thereof may be implemented in code (e.g., as communications management software or firmware) executed by a processor. If implemented in code executed by a processor, the functions of the customer data platform 620, the input module 610, the output module 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the customer data platform 620 may be configured to perform various operations (e.g., receiving, monitoring, transmitting) using or otherwise in cooperation with the input module 610, the output module 615, or both. For example, the customer data platform 620 may receive information from the input module 610, send information to the output module 615, or be integrated in combination with the input module 610, the output module 615, or both to receive information, transmit information, or perform various other operations as described herein.

The customer data platform 620 may support data processing in accordance with examples as disclosed herein.

For example, the customer data platform 620 may be configured as or otherwise support a means for receiving, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process. The customer data platform 620 may be configured as or otherwise support a means for merging, based at least in part on the request to merge, the first unified profile with the second unified profile to generate a merged unified profile comprising a merged set of records comprising the first set of records and the second set of records, the merged unified profile having the first profile identifier. The customer data platform 620 may be configured as or otherwise support a means for generating an association between the second set of records and the first set of records based at least in part on the merging. The customer data platform 620 may be configured as or otherwise support a means for receiving, via the user interface, a request to undo the merging. The customer data platform 620 may be configured as or otherwise support a means for ingesting, based at least in part on the request to undo the merging, the merged set of records into the automated match process by applying the set of rules for the automated match process and excluding the generated association between the second set of records and the first set of records.

By including or configuring the customer data platform 620 in accordance with examples as described herein, the device 605 (e.g., a processor controlling or otherwise coupled to the input module 610, the output module 615, the customer data platform 620, or a combination thereof) may support techniques for reduced processing, reduced power consumption, more efficient utilization of communication resources.

Figure 7:
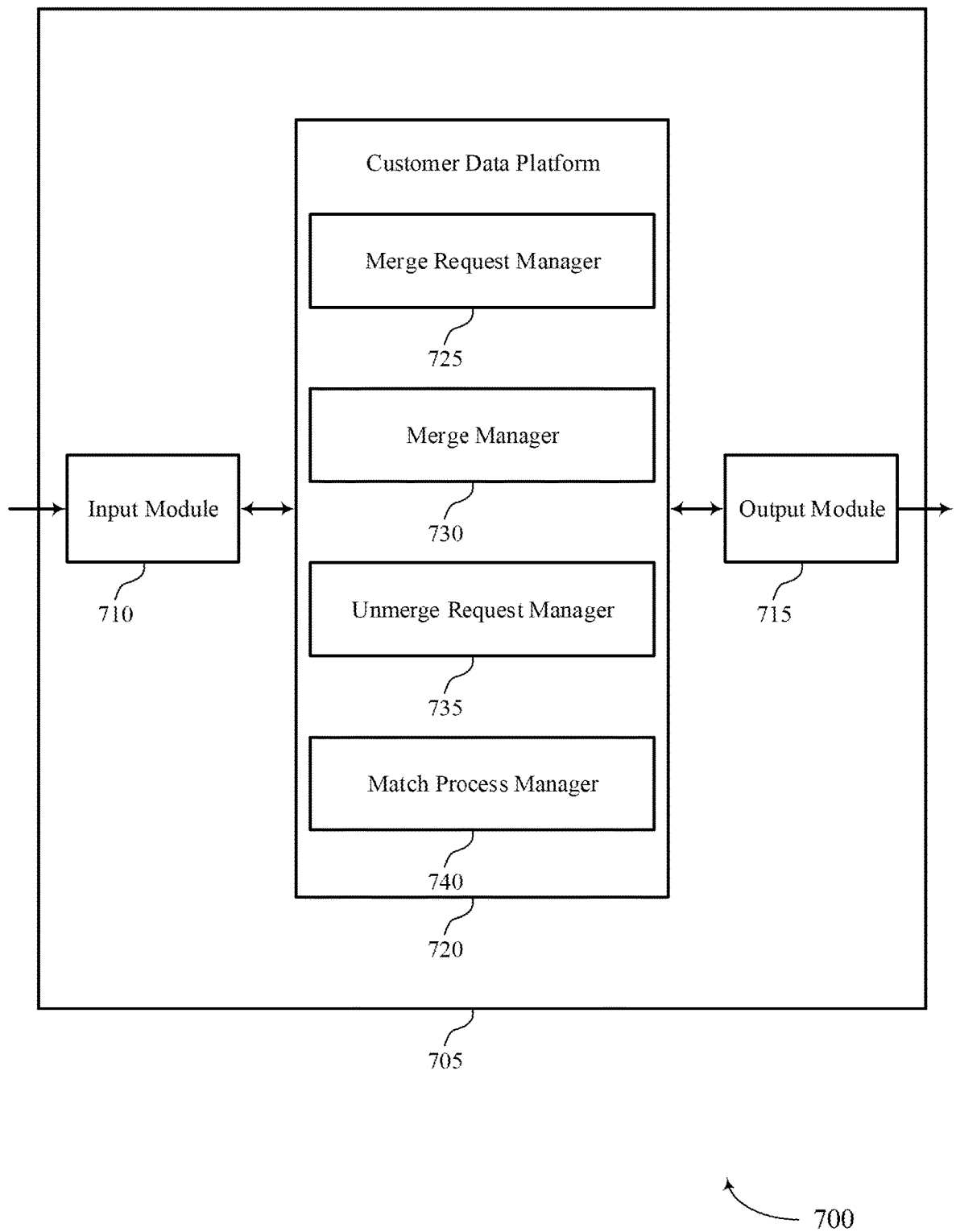

FIG. 7 shows a block diagram 700 of a device 705 that supports evaluating clustering in case of data stewardship actions in accordance with aspects of the present disclosure. The device 705 may be an example of aspects of a device 605 or an application server as described herein. The device 705 may include an input module 710, an output module 715, and a customer data platform 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the customer data platform 920 to support evaluating clustering in case of data stewardship actions. In some cases, the input module 710 may be a component of an I/O controller 910 as described with reference to FIG. 9.

The output module 715 may manage output signals for the device 705. For example, the output module 715 may receive signals from other components of the device 705, such as the customer data platform 720, and may transmit these signals to other components or devices. In some specific examples, the output module 715 may transmit output signals for display in a user interface, for storage in a database or data store, for further processing at a server or server cluster, or for any other processes at any number of devices or systems. In some cases, the output module 715 may be a component of an I/O controller 910 as described with reference to FIG. 9.

The device 705, or various components thereof, may be an example of means for performing various aspects of evaluating clustering in case of data stewardship actions as described herein. For example, the customer data platform 720 may include a merge request manager 725, a merge manager 730, an unmerge request manager 735, a match process manager 740, or any combination thereof. The customer data platform 720 may be an example of aspects of a customer data platform 620 as described herein. In some examples, the customer data platform 720, or various components thereof, may be configured to perform various operations (e.g., receiving, monitoring, transmitting) using or otherwise in cooperation with the input module 710, the output module 715, or both. For example, the customer data platform 720 may receive information from the input module 710, send information to the output module 715, or be integrated in combination with the input module 710, the output module 715, or both to receive information, transmit information, or perform various other operations as described herein.

The customer data platform 720 may support data processing in accordance with examples as disclosed herein. The merge request manager 725 may be configured as or otherwise support a means for receiving, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process. The merge manager 730 may be configured as or otherwise support a means for merging, based at least in part on the request to merge, the first unified profile with the second unified profile to generate a merged unified profile comprising a merged set of records comprising the first set of records and the second set of records, the merged unified profile having the first profile identifier. The merge manager 730 may be configured as or otherwise support a means for generating an association between the second set of records and the first set of records based at least in part on the merging. The unmerge request manager 735 may be configured as or otherwise support a means for receiving, via the user interface, a request to undo the merging. The match process manager 740 may be configured as or otherwise support a means for ingesting, based at least in part on the request to undo the merging, the merged set of records into the automated match process by applying the set of rules for the automated match process and excluding the generated association between the second set of records and the first set of records.

Figure 8:
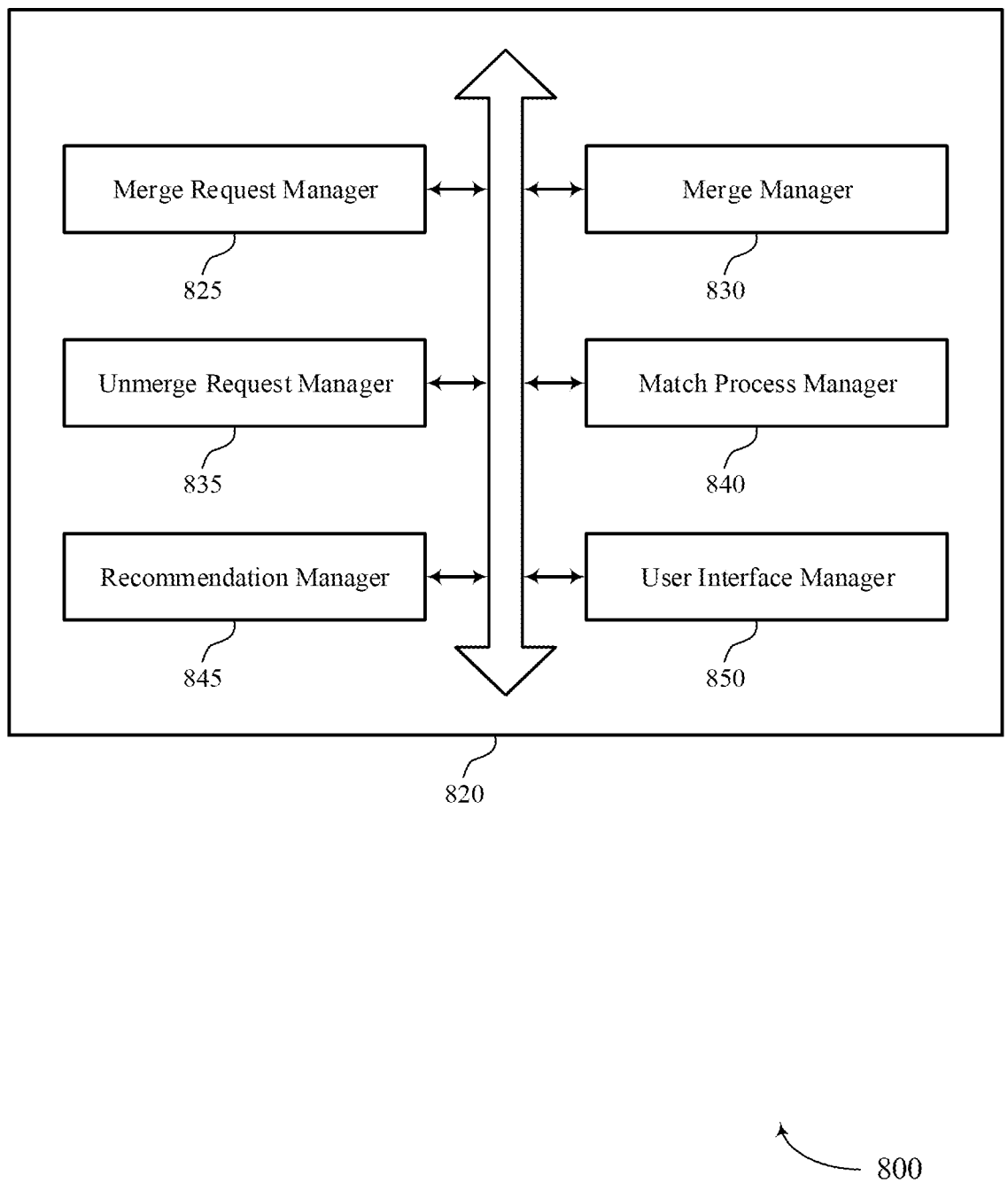
FIG. 8 shows a block diagram of a customer data platform that supports evaluating clustering in case of data stewardship actions in accordance with aspects of the present disclosure.

FIG. 8 shows a block diagram 800 of a customer data platform 820 that supports evaluating clustering in case of data stewardship actions in accordance with aspects of the present disclosure. The customer data platform 820 may be an example of aspects of a customer data platform 620, a customer data platform 720, or both, as described herein. The customer data platform 820, or various components thereof, may be an example of means for performing various aspects of evaluating clustering in case of data stewardship actions as described herein. For example, the customer data platform 820 may include a merge request manager 825, a merge manager 830, an unmerge request manager 835, a match process manager 840, a recommendation manager 845, a user interface manager 850, or any combination thereof. Each of these components may communicate, directly or indirectly, with one another (e.g., via one or more buses).

The customer data platform 820 may support data processing in accordance with examples as disclosed herein. The merge request manager 825 may be configured as or otherwise support a means for receiving, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process. The merge manager 830 may be configured as or otherwise support a means for merging, based at least in part on the request to merge, the first unified profile with the second unified profile to generate a merged unified profile comprising a merged set of records comprising the first set of records and the second set of records, the merged unified profile having the first profile identifier. In some examples, the merge manager 830 may be configured as or otherwise support a means for generating an association between the second set of records and the first set of records based at least in part on the merging. The unmerge request manager 835 may be configured as or otherwise support a means for receiving, via the user interface, a request to undo the merging. The match process manager 840 may be configured as or otherwise support a means for ingesting, based at least in part on the request to undo the merging, the merged set of records into the automated match process by applying the set of rules for the automated match process and excluding the generated association between the second set of records and the first set of records.

In some examples, the match process manager 840 may be configured as or otherwise support a means for identifying a change in an automated match system, the change occurring after merging the first unified profile with the second unified profile and before the request to undo the merging. In some examples, the match process manager 840 may be configured as or otherwise support a means for identifying, based at least in part on the ingesting, one or more re-clustered sets of records produced by the automated match process. In some examples, the match process manager 840 may be configured as or otherwise support a means for wherein the automated match process produces the one or more re-clustered sets of records based at least in part on the change to the automated match system.

In some examples, the change to the automated match system comprises an addition of a record to the merged set of records. In some examples, the change to the automated match system comprises a deletion of a record in the merged set of records. In some examples, the change to the automated match system comprises a change to the set of rules for the automated match process.

In some examples, the match process manager 840 may be configured as or otherwise support a means for associating a re-clustered profile identifier with each of the one or more re-clustered sets of records.

In some examples, the match process manager 840 may be configured as or otherwise support a means for identifying a first re-clustered set of records from the one or more re-clustered sets of records based at least in part on a number of contact points in the first re-clustered set of records.

In some examples, associating a re-clustered profile identifier with each of the one or more re-clustered sets of records comprises associating the first profile identifier with the first re-clustered set of records based at least in part on the number of contact points in the first re-clustered set of records.

In some examples, the number of contact points in the first re-clustered set of records is at least equal to a number of records in each of the one or more re-clustered sets of records.

In some examples, the user interface manager 850 may be configured as or otherwise support a means for displaying, via the user interface, information associated with the one or more re-clustered sets of records.

In some examples, the information comprises one or more of the re-clustered profile identifiers, the one or more re-clustered sets of records, or a combination thereof.

In some examples, the recommendation manager 845 may be configured as or otherwise support a means for periodically performing an analysis of the set of rules for the automated match process and the first and second set of records. In some examples, the recommendation manager 845 may be configured as or otherwise support a means for identifying one or more recommendations for merging or unmerging records based at least in part on the analysis.

In some examples, the recommendation manager 845 may be configured as or otherwise support a means for generating a prompt to merge or unmerge records based at least in part on the analysis and the identifying. In some examples, the recommendation manager 845 may be configured as or otherwise support a means for wherein receiving, via the user interface, a request to merge or receiving, via the user interface, a request to undo the merging, is based at least in part on the prompt.

In some examples, the merge manager 830 may be configured as or otherwise support a means for associating the first profile identifier with the merged unified profile based at least in part on a number of contact points of the first unified profile being at least equal to a number of contact points of the second unified profile.

In some examples, to support ingesting the merged set of records into the automated match process, the match process manager 840 may be configured as or otherwise support a means for retrieving, from an input record storage area, one or more input records associated with one or more records comprised in the merged set of records. In some examples, to support ingesting the merged set of records into the automated match process, the match process manager 840 may be configured as or otherwise support a means for deleting the merged set of records. In some examples, to support ingesting the merged set of records into the automated match process, the match process manager 840 may be configured as or otherwise support a means for ingesting the one or more input records into the automated match process.

In some examples, the merge manager 830 may be configured as or otherwise support a means for disassociating the first profile identifier from the first set of records. In some examples, the merge manager 830 may be configured as or otherwise support a means for disassociating the second profile identifier from the second set of records.

In some examples, the match process manager 840 may be configured as or otherwise support a means for disassociating the first profile identifier from the merged set of records. In some examples, the match process manager 840 may be configured as or otherwise support a means for disassociating, from the first profile identifier, one or more references to the first profile identifier.

Figure 9:
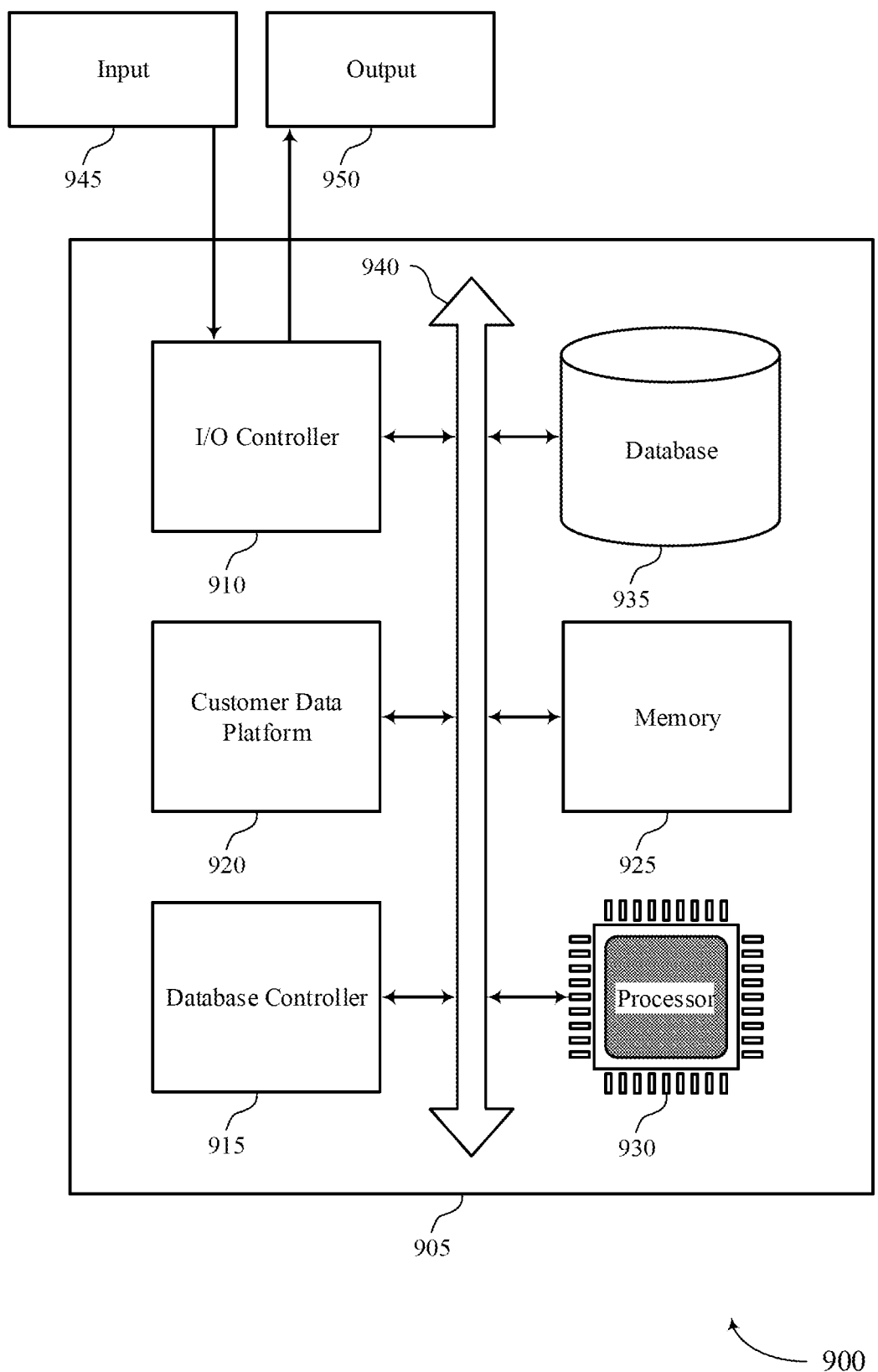
FIG. 9 shows a diagram of a system including a device that supports evaluating clustering in case of data stewardship actions in accordance with aspects of the present disclosure.

FIG. 9 shows a diagram of a system 900 including a device 905 that supports evaluating clustering in case of data stewardship actions in accordance with aspects of the present disclosure. The device 905 may be an example of or include the components of a device 605, a device 705, or an application server as described herein. The device 905 may include components for bi-directional data communications including components for transmitting and receiving communications, such as a customer data platform 920, an I/O controller 910, a database controller 915, a memory 925, a processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In other cases, the I/O controller 910 may represent or interact with a modem, a keyboard, a mouse, a touchscreen, or a similar device. In some cases, the I/O controller 910 may be implemented as part of a processor. In some cases, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and ROM. The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting evaluating clustering in case of data stewardship actions).

The customer data platform 920 may support data processing in accordance with examples as disclosed herein. For example, the customer data platform 920 may be configured as or otherwise support a means for receiving, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process. The customer data platform 920 may be configured as or otherwise support a means for merging, based at least in part on the request to merge, the first unified profile with the second unified profile to generate a merged unified profile comprising a merged set of records comprising the first set of records and the second set of records, the merged unified profile having the first profile identifier. The customer data platform 920 may be configured as or otherwise support a means for generating an association between the second set of records and the first set of records based at least in part on the merging. The customer data platform 920 may be configured as or otherwise support a means for receiving, via the user interface, a request to undo the merging. The customer data platform 920 may be configured as or otherwise support a means for ingesting, based at least in part on the request to undo the merging, the merged set of records into the automated match process by applying the set of rules for the automated match process and excluding the generated association between the second set of records and the first set of records.

By including or configuring the customer data platform 920 in accordance with examples as described herein, the device 905 may support techniques for improved user experience related to a fresh state of a system, improved user experience related to reduced processing, more efficient utilization of communication resources, improved coordination between devices, and improved utilization of processing capability.

Figure 10:
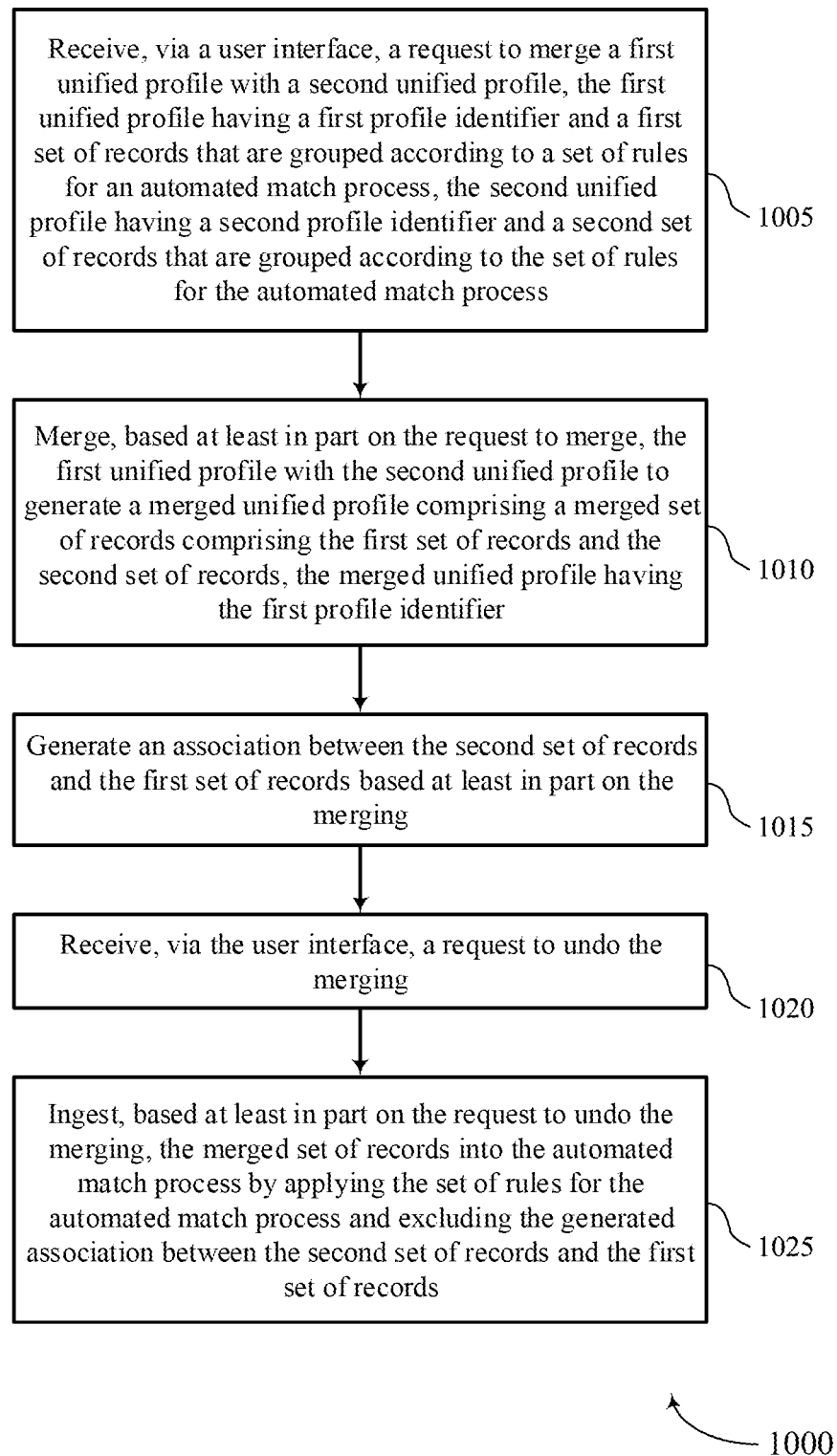
FIGS. 10 through 13 show flowcharts illustrating methods that support evaluating clustering in case of data stewardship actions in accordance with aspects of the present disclosure.

FIG. 10 shows a flowchart illustrating a method 1000 that supports evaluating clustering in case of data stewardship actions in accordance with aspects of the present disclosure. The operations of the method 1000 may be implemented by an application server or its components as described herein. For example, the operations of the method 1000 may be performed by an application server as described with reference to FIGS. 1 through 9. In some examples, an application server may execute a set of instructions to control the functional elements of the application server to perform the described functions. Additionally or alternatively, the application server may perform aspects of the described functions using special-purpose hardware.

At 1005, the method may include receiving, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process. The operations of 1005 may be performed in accordance with examples as disclosed herein. In some examples, aspects of the operations of 1005 may be performed by a merge request manager 825 as described with reference to FIG. 8.

At 1010, the method may include merging, based at least in part on the request to merge, the first unified profile with the second unified profile to generate a merged unified profile comprising a merged set of records comprising the first set of records and the second set of records, the merged unified profile having the first profile identifier. The operations of 1010 may be performed in accordance with examples as disclosed herein. In some examples, aspects of the operations of 1010 may be performed by a merge manager 830 as described with reference to FIG. 8.

At 1015, the method may include generating an association between the second set of records and the first set of records based at least in part on the merging. The operations of 1015 may be performed in accordance with examples as disclosed herein. In some examples, aspects of the operations of 1015 may be performed by a merge manager 830 as described with reference to FIG. 8.

At 1020, the method may include receiving, via the user interface, a request to undo the merging. The operations of 1020 may be performed in accordance with examples as disclosed herein. In some examples, aspects of the operations of 1020 may be performed by an unmerge request manager 835 as described with reference to FIG. 8.

At 1025, the method may include ingesting, based at least in part on the request to undo the merging, the merged set of records into the automated match process by applying the set of rules for the automated match process and excluding the generated association between the second set of records and the first set of records. The operations of 1025 may be performed in accordance with examples as disclosed herein. In some examples, aspects of the operations of 1025 may be performed by a match process manager 840 as described with reference to FIG. 8.

Figure 11:
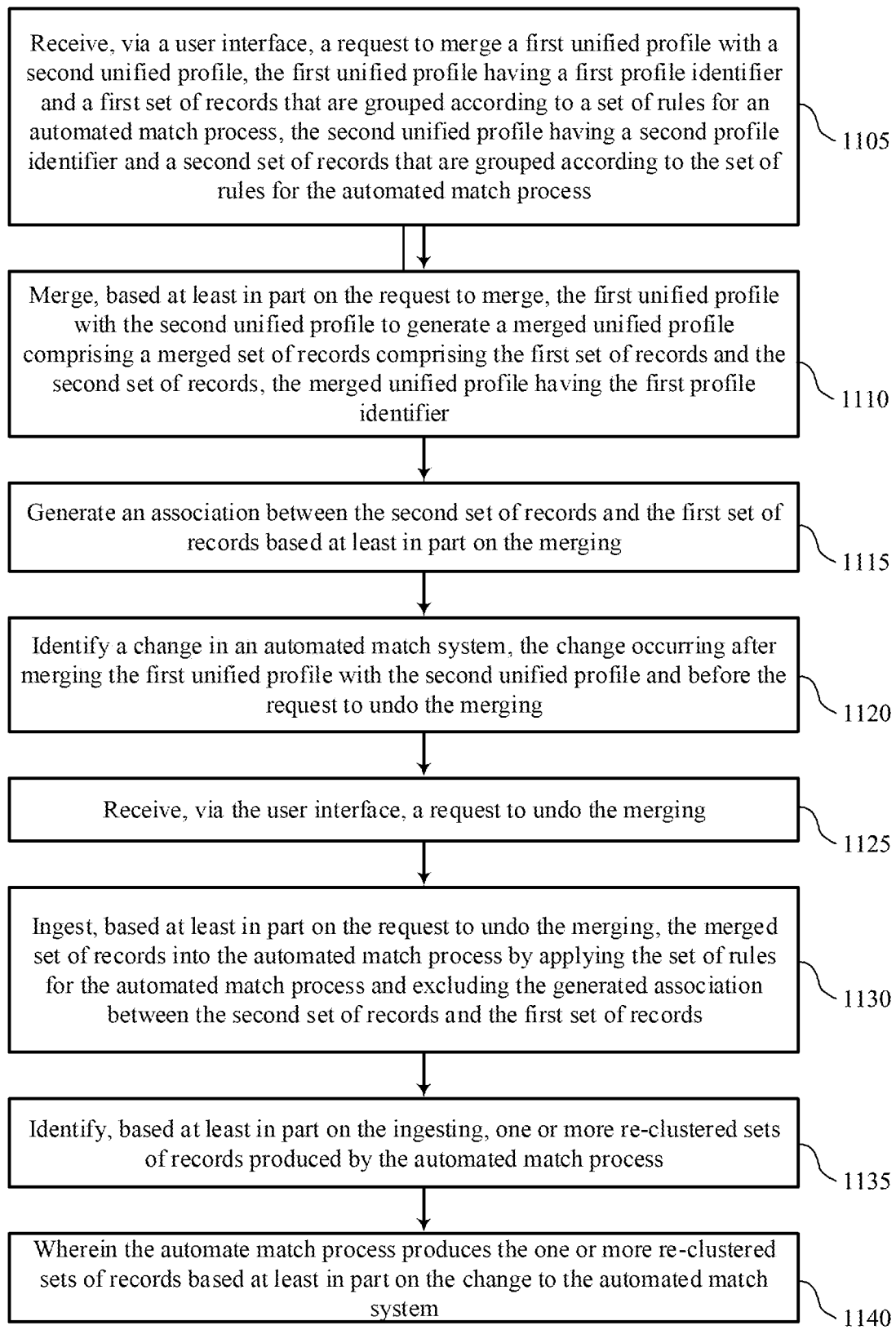

FIG. 11 shows a flowchart illustrating a method 1100 that supports evaluating clustering in case of data stewardship actions in accordance with aspects of the present disclosure. The operations of the method 1100 may be implemented by an application server or its components as described herein. For example, the operations of the method 1100 may be performed by an application server as described with reference to FIGS. 1 through 9. In some examples, an application server may execute a set of instructions to control the functional elements of the application server to perform the described functions. Additionally or alternatively, the application server may perform aspects of the described functions using special-purpose hardware.

At 1105, the method may include receiving, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process. The operations of 1105 may be performed in accordance with examples as disclosed herein. In some examples, aspects of the operations of 1105 may be performed by a merge request manager 825 as described with reference to FIG. 8.

At 1110, the method may include merging, based at least in part on the request to merge, the first unified profile with the second unified profile to generate a merged unified profile comprising a merged set of records comprising the first set of records and the second set of records, the merged unified profile having the first profile identifier. The operations of 1110 may be performed in accordance with examples as disclosed herein. In some examples, aspects of the operations of 1110 may be performed by a merge manager 830 as described with reference to FIG. 8.

At 1115, the method may include generating an association between the second set of records and the first set of records based at least in part on the merging. The operations of 1115 may be performed in accordance with examples as disclosed herein. In some examples, aspects of the operations of 1115 may be performed by a merge manager 830 as described with reference to FIG. 8.

At 1120, the method may include identifying a change in an automated match system, the change occurring after merging the first unified profile with the second unified profile and before the request to undo the merging. The operations of 1120 may be performed in accordance with examples as disclosed herein. In some examples, aspects of the operations of 1120 may be performed by a match process manager 840 as described with reference to FIG. 8.

At 1125, the method may include receiving, via the user interface, a request to undo the merging. The operations of 1125 may be performed in accordance with examples as disclosed herein. In some examples, aspects of the operations of 1125 may be performed by an unmerge request manager 835 as described with reference to FIG. 8.

At 1130, the method may include ingesting, based at least in part on the request to undo the merging, the merged set of records into the automated match process by applying the set of rules for the automated match process and excluding the generated association between the second set of records and the first set of records. The operations of 1130 may be performed in accordance with examples as disclosed herein. In some examples, aspects of the operations of 1130 may be performed by a match process manager 840 as described with reference to FIG. 8.

At 1135, the method may include identifying, based at least in part on the ingesting, one or more re-clustered sets of records produced by the automated match process. The operations of 1135 may be performed in accordance with examples as disclosed herein. In some examples, aspects of the operations of 1135 may be performed by a match process manager 840 as described with reference to FIG. 8.

At 1140, the method may include wherein the automated match process produces the one or more re-clustered sets of records based at least in part on the change to the automated match system. The operations of 1140 may be performed in accordance with examples as disclosed herein. In some examples, aspects of the operations of 1140 may be performed by a match process manager 840 as described with reference to FIG. 8.

Figure 12:
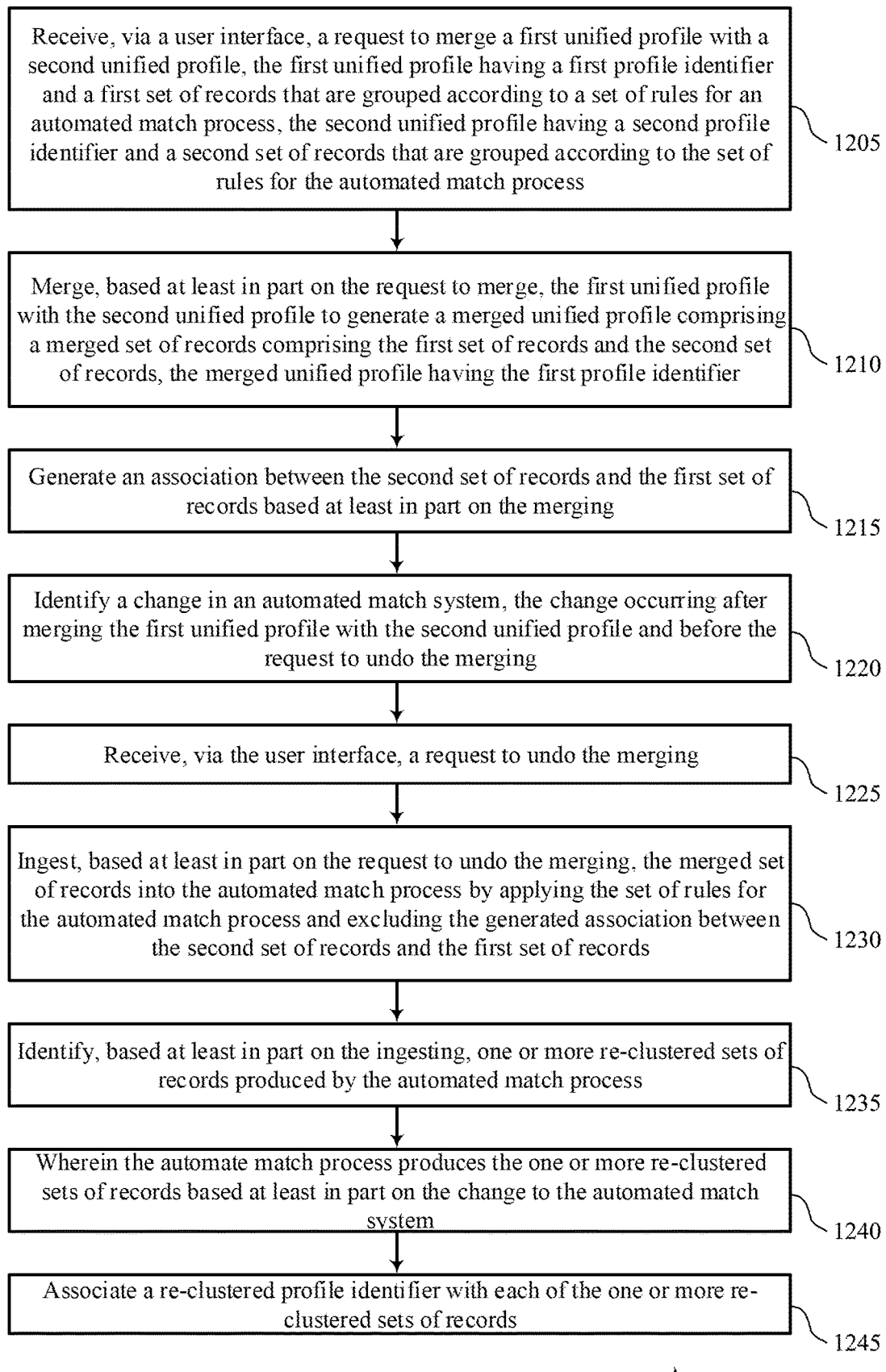

FIG. 12 shows a flowchart illustrating a method 1200 that supports evaluating clustering in case of data stewardship actions in accordance with aspects of the present disclosure. The operations of the method 1200 may be implemented by an application server or its components as described herein. For example, the operations of the method 1200 may be performed by an application server as described with reference to FIGS. 1 through 9. In some examples, an application server may execute a set of instructions to control the functional elements of the application server to perform the described functions. Additionally or alternatively, the application server may perform aspects of the described functions using special-purpose hardware.

At 1205, the method may include receiving, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process. The operations of 1205 may be performed in accordance with examples as disclosed herein. In some examples, aspects of the operations of 1205 may be performed by a merge request manager 825 as described with reference to FIG. 8.

At 1210, the method may include merging, based at least in part on the request to merge, the first unified profile with the second unified profile to generate a merged unified profile comprising a merged set of records comprising the first set of records and the second set of records, the merged unified profile having the first profile identifier. The operations of 1210 may be performed in accordance with examples as disclosed herein. In some examples, aspects of the operations of 1210 may be performed by a merge manager 830 as described with reference to FIG. 8.

At 1215, the method may include generating an association between the second set of records and the first set of records based at least in part on the merging. The operations of 1215 may be performed in accordance with examples as disclosed herein. In some examples, aspects of the operations of 1215 may be performed by a merge manager 830 as described with reference to FIG. 8.

At 1220, the method may include identifying a change in an automated match system, the change occurring after merging the first unified profile with the second unified profile and before the request to undo the merging. The operations of 1220 may be performed in accordance with examples as disclosed herein. In some examples, aspects of the operations of 1220 may be performed by a match process manager 840 as described with reference to FIG. 8.

At 1225, the method may include receiving, via the user interface, a request to undo the merging. The operations of 1225 may be performed in accordance with examples as disclosed herein. In some examples, aspects of the operations of 1225 may be performed by an unmerge request manager 835 as described with reference to FIG. 8.

At 1230, the method may include ingesting, based at least in part on the request to undo the merging, the merged set of records into the automated match process by applying the set of rules for the automated match process and excluding the generated association between the second set of records and the first set of records. The operations of 1230 may be performed in accordance with examples as disclosed herein. In some examples, aspects of the operations of 1230 may be performed by a match process manager 840 as described with reference to FIG. 8.

At 1235, the method may include identifying, based at least in part on the ingesting, one or more re-clustered sets of records produced by the automated match process. The operations of 1235 may be performed in accordance with examples as disclosed herein. In some examples, aspects of the operations of 1235 may be performed by a match process manager 840 as described with reference to FIG. 8.

At 1240, the method may include wherein the automated match process produces the one or more re-clustered sets of records based at least in part on the change to the automated match system. The operations of 1240 may be performed in accordance with examples as disclosed herein. In some examples, aspects of the operations of 1240 may be performed by a match process manager 840 as described with reference to FIG. 8.

At 1245, the method may include associating a re-clustered profile identifier with each of the one or more re-clustered sets of records. The operations of 1245 may be performed in accordance with examples as disclosed herein. In some examples, aspects of the operations of 1245 may be performed by a match process manager 840 as described with reference to FIG. 8.

Figure 13:
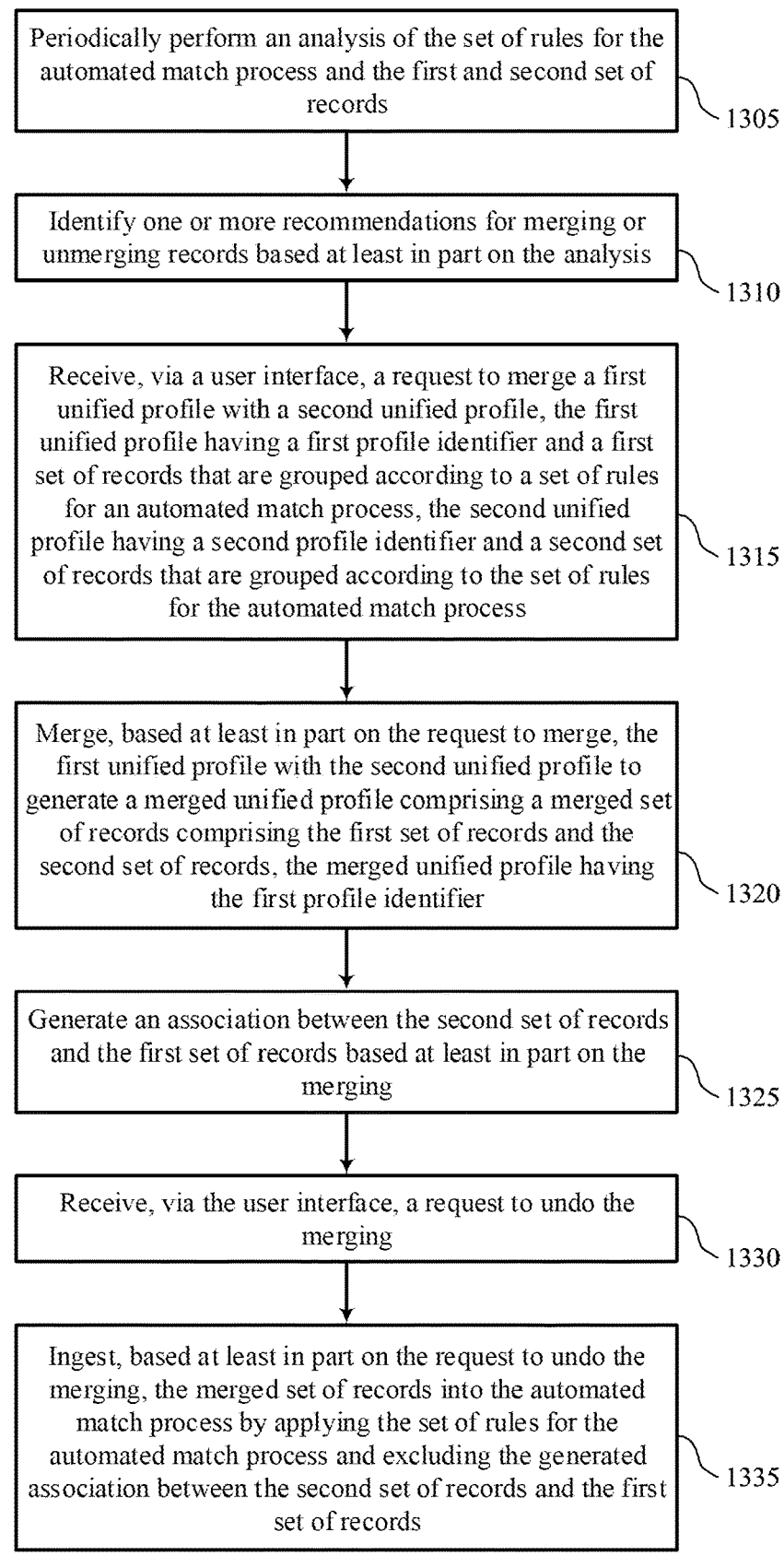

FIG. 13 shows a flowchart illustrating a method 1300 that supports evaluating clustering in case of data stewardship actions in accordance with aspects of the present disclosure. The operations of the method 1300 may be implemented by an application server or its components as described herein. For example, the operations of the method 1300 may be performed by an application server as described with reference to FIGS. 1 through 9. In some examples, an application server may execute a set of instructions to control the functional elements of the application server to perform the described functions. Additionally or alternatively, the application server may perform aspects of the described functions using special-purpose hardware.

At 1305, the method may include periodically performing an analysis of the set of rules for the automated match process and the first and second set of records. The operations of 1305 may be performed in accordance with examples as disclosed herein. In some examples, aspects of the operations of 1305 may be performed by a recommendation manager 845 as described with reference to FIG. 8.

At 1310, the method may include identifying one or more recommendations for merging or unmerging records based at least in part on the analysis. The operations of 1310 may be performed in accordance with examples as disclosed herein. In some examples, aspects of the operations of 1310 may be performed by a recommendation manager 845 as described with reference to FIG. 8.

At 1315, the method may include receiving, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process. The operations of 1315 may be performed in accordance with examples as disclosed herein. In some examples, aspects of the operations of 1315 may be performed by a merge request manager 825 as described with reference to FIG. 8.

At 1320, the method may include merging, based at least in part on the request to merge, the first unified profile with the second unified profile to generate a merged unified profile comprising a merged set of records comprising the first set of records and the second set of records, the merged unified profile having the first profile identifier. The operations of 1320 may be performed in accordance with examples as disclosed herein. In some examples, aspects of the operations of 1320 may be performed by a merge manager 830 as described with reference to FIG. 8.

At 1325, the method may include generating an association between the second set of records and the first set of records based at least in part on the merging. The operations of 1325 may be performed in accordance with examples as disclosed herein. In some examples, aspects of the operations of 1325 may be performed by a merge manager 830 as described with reference to FIG. 8.

At 1330, the method may include receiving, via the user interface, a request to undo the merging. The operations of 1330 may be performed in accordance with examples as disclosed herein. In some examples, aspects of the operations of 1330 may be performed by an unmerge request manager 835 as described with reference to FIG. 8.

At 1335, the method may include ingesting, based at least in part on the request to undo the merging, the merged set of records into the automated match process by applying the set of rules for the automated match process and excluding the generated association between the second set of records and the first set of records. The operations of 1335 may be performed in accordance with examples as disclosed herein. In some examples, aspects of the operations of 1335 may be performed by a match process manager 840 as described with reference to FIG. 8.

A method for data processing is described. The method may include receiving, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process, merging, based at least in part on the request to merge, the first unified profile with the second unified profile to generate a merged unified profile comprising a merged set of records comprising the first set of records and the second set of records, the merged unified profile having the first profile identifier, generating an association between the second set of records and the first set of records based at least in part on the merging, receiving, via the user interface, a request to undo the merging, and ingesting, based at least in part on the request to undo the merging, the merged set of records into the automated match process by applying the set of rules for the automated match process and excluding the generated association between the second set of records and the first set of records.

An apparatus for data processing is described. The apparatus may include a processor, memory coupled with the processor, and instructions stored in the memory. The instructions may be executable by the processor to cause the apparatus to receive, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process, merging, based at least in part on the request to merge, the first unified profile with the second unified profile to generate a merged unified profile comprising a merged set of records comprising the first set of records and the second set of records, the merged unified profile having the first profile identifier, generate an association between the second set of records and the first set of records based at least in part on the merging, receive, via the user interface, a request to undo the merging, and ingesting, based at least in part on the request to undo the merging, the merged set of records into the automated match process by applying the set of rules for the automated match process and excluding the generated association between the second set of records and the first set of records.

Another apparatus for data processing is described. The apparatus may include means for receiving, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process, means for merging, based at least in part on the request to merge, the first unified profile with the second unified profile to generate a merged unified profile comprising a merged set of records comprising the first set of records and the second set of records, the merged unified profile having the first profile identifier, means for generating an association between the second set of records and the first set of records based at least in part on the merging, means for receiving, via the user interface, a request to undo the merging, and means for ingesting, based at least in part on the request to undo the merging, the merged set of records into the automated match process by applying the set of rules for the automated match process and excluding the generated association between the second set of records and the first set of records.

A non-transitory computer-readable medium storing code for data processing is described. The code may include instructions executable by a processor to receive, via a user interface, a request to merge a first unified profile with a second unified profile, the first unified profile having a first profile identifier and a first set of records that are grouped according to a set of rules for an automated match process, the second unified profile having a second profile identifier and a second set of records that are grouped according to the set of rules for the automated match process, merging, based at least in part on the request to merge, the first unified profile with the second unified profile to generate a merged unified profile comprising a merged set of records comprising the first set of records and the second set of records, the merged unified profile having the first profile identifier, generate an association between the second set of records and the first set of records based at least in part on the merging, receive, via the user interface, a request to undo the merging, and ingesting, based at least in part on the request to undo the merging, the merged set of records into the automated match process by applying the set of rules for the automated match process and excluding the generated association between the second set of records and the first set of records.

Some examples of the method, apparatuses, and non-transitory computer-readable medium described herein may further include operations, features, means, or instructions for identifying a change in an automated match system, the change occurring after merging the first unified profile with the second unified profile and before the request to undo the merging, identifying, based at least in part on the ingesting, one or more re-clustered sets of records produced by the automated match process, and wherein the automated match process produces the one or more re-clustered sets of records based at least in part on the change to the automated match system.

In some examples of the method, apparatuses, and non-transitory computer-readable medium described herein, the change to the automated match system comprises an addition of a record to the merged set of records.

In some examples of the method, apparatuses, and non-transitory computer-readable medium described herein, the change to the automated match system comprises a deletion of a record in the merged set of records.

In some examples of the method, apparatuses, and non-transitory computer-readable medium described herein, the change to the automated match system comprises a change to the set of rules for the automated match process.

Some examples of the method, apparatuses, and non-transitory computer-readable medium described herein may further include operations, features, means, or instructions for associating a re-clustered profile identifier with each of the one or more re-clustered sets of records.

Some examples of the method, apparatuses, and non-transitory computer-readable medium described herein may further include operations, features, means, or instructions for identifying a first re-clustered set of records from the one or more re-clustered sets of records based at least in part on a number of contact points in the first re-clustered set of records.

Some examples of the method, apparatuses, and non-transitory computer-readable medium described herein may further include operations, features, means, or instructions for associating a re-clustered profile identifier with each of the one or more re-clustered sets of records comprises associating the first profile identifier with the first re-clustered set of records based at least in part on the number of contact points in the first re-clustered set of records.

In some examples of the method, apparatuses, and non-transitory computer-readable medium described herein, the number of contact points in the first re-clustered set of records may be at least equal to a number of records in each of the one or more re-clustered sets of records.

In some examples of the method, apparatuses, and non-transitory computer-readable medium described herein, displaying, via the user interface, information associated with the one or more re-clustered sets of records.

In some examples of the method, apparatuses, and non-transitory computer-readable medium described herein, the information comprises one or more of the re-clustered profile identifiers, the one or more re-clustered sets of records, or a combination thereof.

In some examples of the method, apparatuses, and non-transitory computer-readable medium described herein, periodically performing an analysis of the set of rules for the automated match process and the first and second set of records and identifying one or more recommendations for merging or unmerging records based at least in part on the analysis.

Some examples of the method, apparatuses, and non-transitory computer-readable medium described herein may further include operations, features, means, or instructions for generating a prompt to merge or unmerge records based at least in part on the analysis and the identifying and wherein receiving, via the user interface, a request to merge or receiving, via the user interface, a request to undo the merging, may be based at least in part on the prompt.

Some examples of the method, apparatuses, and non-transitory computer-readable medium described herein may further include operations, features, means, or instructions for associating the first profile identifier with the merged unified profile based at least in part on a number of contact points of the first unified profile being at least equal to a number of contact points of the second unified profile.

In some examples of the method, apparatuses, and non-transitory computer-readable medium described herein, ingesting the merged set of records into the automated match process may include operations, features, means, or instructions for retrieving, from an input record storage area, one or more input records associated with one or more records comprised in the merged set of records, deleting the merged set of records, and ingesting the one or more input records into the automated match process.

Some examples of the method, apparatuses, and non-transitory computer-readable medium described herein may further include operations, features, means, or instructions for disassociating the first profile identifier from the first set of records and disassociating the second profile identifier from the second set of records.

Some examples of the method, apparatuses, and non-transitory computer-readable medium described herein may further include operations, features, means, or instructions for disassociating the first profile identifier from the merged set of records and disassociating, from the first profile identifier, one or more references to the first profile identifier.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, read-only memory (ROM), electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

ingesting, into an automated match process associated with an automated match system, a plurality of records to produce a first unified profile having a first profile identifier and a first set of records that are grouped according to a set of matching rules of the automated match process and to produce a second unified profile having a second profile identifier and a second set of records that are grouped according to the set of matching rules for the automated match process;

receiving, via a user interface associated with the automated match system, a request to merge the first unified profile with the second unified profile;

merging, based at least in part on the request to merge, the first unified profile with the second unified profile to generate a merged unified profile comprising a merged set of records comprising the first set of records and the second set of records, the merged unified profile having the first profile identifier;

generating an association between the second set of records and the first set of records based at least in part on the merging;

receiving, via the user interface, a request to undo the merging; and re-ingesting, based at least in part on the request to undo the merging, the merged set of records into the automated match process by:

excluding the generated association between the second set of records and the first set of records, applying, in accordance with the exclusion of the generated association, the set of matching rules for the automated match process to the merged set of records, the set of matching rules for the automated match process being the same set of matching rules according to which the first set of records and the second set of records were grouped, and preserving a change in the automated match system through application of the set of matching rules for the automated match process, the set of matching rules for the automated match process being the same set of matching rules according to which the first set of records and the second set of records were grouped, the change occurring after merging the first unified profile with the second unified profile and before the request to undo the merging.

2. The method of claim 1, further comprising:
identifying, based at least in part on the re-ingesting, one or more re-clustered sets of records produced by the automated match process;
wherein the automated match process produces the one or more re-clustered sets of records based at least in part on the change to the automated match system.

3. The method of claim 2, wherein the change to the automated match system comprises an addition of a record to the merged set of records.

4. The method of claim 2, wherein the change to the automated match system comprises a deletion of a record in the merged set of records.

5. The method of claim 2, wherein the change to the automated match system comprises a change to the set of matching rules for the automated match process.

6. The method of claim 2, further comprising:
associating a re-clustered profile identifier with each of the one or more re-clustered sets of records.

7. The method of claim 6, further comprising:
identifying a first re-clustered set of records from the one or more re-clustered sets of records based at least in part on a number of contact points in the first re-clustered set of records.

8. The method of claim 7, wherein associating the re-clustered profile identifier with each of the one or more re-clustered sets of records comprises associating the first profile identifier with the first re-clustered set of records based at least in part on the number of contact points in the first re-clustered set of records.

9. The method of claim 7, wherein the number of contact points in the first re-clustered set of records is at least equal to a number of records in each of the one or more re-clustered sets of records.

10. The method of claim 6, further comprising:
displaying, via the user interface, information associated with the one or more re-clustered sets of records.

11. The method of claim 10, wherein the information comprises one or more of the re-clustered profile identifiers, the one or more re-clustered sets of records, or a combination thereof.

12. The method of claim 1, further comprising:
periodically performing an analysis of the set of matching rules for the automated match process, the first set of records, and the second set of records; and
identifying one or more recommendations for merging or unmerging records based at least in part on the analysis.

13. Method of claim 12, further comprising:
generating a prompt to merge or unmerge records based at least in part on the analysis and the identifying;
wherein receiving, via the user interface, a request to merge or receiving, via the user interface, a request to undo the merging, is based at least in part on the prompt.

14. The method of claim 1, further comprising:
associating the first profile identifier with the merged unified profile based at least in part on a number of contact points of the first unified profile being at least equal to a number of contact points of the second unified profile.

15. The method of claim 1, wherein re-ingesting the merged set of records into the automated match process comprises:
retrieving, from an input record storage area, one or more input records associated with one or more records comprised in the merged set of records;
deleting the merged set of records; and
re-ingesting the one or more input records into the automated match process.

16. The method of claim 1, further comprising:
disassociating the first profile identifier from the first set of records; and
disassociating the second profile identifier from the second set of records.

17. The method of claim 1, further comprising:
disassociating the first profile identifier from the merged set of records; and
disassociating, from the first profile identifier, one or more references to the first profile identifier.

18. An apparatus for data processing, comprising:
a processor,
memory coupled with the processor; and
instructions stored in the memory and executable by the processor to cause the apparatus to:
ingest, into an automated match process associated with an automated match system, a plurality of records to produce a first unified profile having a first profile identifier and a first set of records that are grouped according to a set of matching rules of the automated match process and to produce a second unified profile having a second profile identifier and a second set of records that are grouped according to the set of matching rules for the automated match process;
receive, via a user interface associated with the automated match system, a request to merge the first unified profile with the second unified profile;
merge, based at least in part on the request to merge, the first unified profile with the second unified profile to generate a merged unified profile comprising a merged set of records comprising the first set of records and the second set of records, the merged unified profile having the first profile identifier;
generate an association between the second set of records and the first set of records based at least in part on the merging;
receive, via the user interface, a request to undo the merging; and re-ingest, based at least in part on the request to undo the merging, the merged set of records into the automated match process by:
  excluding the generated association between the second set of records and the first set of records,
  applying, in accordance with the exclusion of the generated association, the set of matching rules for the automated match process to the merged set of records, the set of matching rules for the automated match process being the same set of matching rules according to which the first set of records and the second set of records were grouped, and
  preserving a change in the automated match system through application of the set of matching rules for the automated match process, the set of matching rules for the automated match process being the same set of matching rules according to which the first set of records and the second set of records were grouped, the change occurring after merging the first unified profile with the second unified profile and before the request to undo the merging.

19. The apparatus of claim 18, wherein the instructions are further executable by the processor to cause the apparatus to:
  identify, based at least in part on the re-ingesting, one or more re-clustered sets of records produced by the automated match process;
  wherein the automated match process produces the one or more re-clustered sets of records based at least in part on the change to the automated match system.

20. A non-transitory computer-readable medium storing code for data processing, the code comprising instructions executable by a processor to:
  ingest, into an automated match process associated with an automated match system, a plurality of records to produce a first unified profile having a first profile identifier and a first set of records that are grouped according to a set of matching rules of the automated match process and to produce a second unified profile having a second profile identifier and a second set of records that are grouped according to the set of matching rules for the automated match process;
  receive, via a user interface associated with the automated match system, a request to merge the first unified profile with the second unified profile;
  merge, based at least in part on the request to merge, the first unified profile with the second unified profile to generate a merged unified profile comprising a merged set of records comprising the first set of records and the second set of records, the merged unified profile having the first profile identifier;
  generate an association between the second set of records and the first set of records based at least in part on the merging;
  receive, via the user interface, a request to undo the merging; and
  re-ingest, based at least in part on the request to undo the merging, the merged set of records into the automated match process by:
    excluding the generated association between the second set of records and the first set of records,
    applying, in accordance with the exclusion of the generated association, the set of matching rules for the automated match process to the merged set of records, the set of matching rules for the automated match process being the same set of matching rules according to which the first set of records and the second set of records were grouped, and
    preserving a change in the automated match system through application of the set of matching rules for the automated match process, the set of matching rules for the automated match process being the same set of matching rules according to which the first set of records and the second set of records were grouped, the change occurring after merging the first unified profile with the second unified profile and before the request to undo the merging.

* * * * *